US007593124B1

(12) United States Patent
Sheng et al.

(10) Patent No.: US 7,593,124 B1
(45) Date of Patent: Sep. 22, 2009

(54) SYSTEM AND METHOD FOR MANAGING DEVICES

(75) Inventors: Yongmin Sheng, Novi, MI (US); Yuan Wu, Shelby Township, MI (US); Kenneth John Russel, Westland, MI (US); James L. Jones, III, Belleville, MI (US)

(73) Assignee: Yazaki North America, Inc., Canton, MI (US)

( * ) Notice: Subject to any disclaimer, the term of this patent is extended or adjusted under 35 U.S.C. 154(b) by 1048 days.

(21) Appl. No.: 10/774,026

(22) Filed: Feb. 6, 2004

(51) Int. Cl.
*G06F 15/00* (2006.01)
*G06F 9/44* (2006.01)
*G01M 17/00* (2006.01)

(52) U.S. Cl. .................. 358/1.15; 717/101; 717/169; 701/36

(58) Field of Classification Search ............ 358/1.15, 358/442, 444, 1.9, 1.13, 434; 701/1, 24, 701/91, 36; 717/120, 171, 170, 176, 101, 717/169; 307/9.1
See application file for complete search history.

(56) References Cited

U.S. PATENT DOCUMENTS

| | | | |
|---|---|---|---|
| 5,365,438 A | | 11/1994 | Mitchell et al. |
| 5,652,393 A | | 7/1997 | Lawson |
| 5,752,007 A | * | 5/1998 | Morrison ................ 703/2 |
| 6,173,218 B1 | * | 1/2001 | Vian .................... 701/1 |
| 6,360,145 B1 | | 3/2002 | Robinson |
| 6,363,318 B1 | | 3/2002 | Wang et al. |
| 6,700,795 B1 | * | 3/2004 | Jones et al. ............ 361/784 |
| 7,235,898 B1 | * | 6/2007 | Jones et al. ............ 307/9.1 |
| 7,346,370 B2 | * | 3/2008 | Spaur et al. ............ 455/556.1 |
| 2002/0103737 A1 | * | 8/2002 | Briere .................. 705/36 |
| 2002/0156603 A1 | * | 10/2002 | Alhadef et al. ........... 703/2 |
| 2003/0051026 A1 | * | 3/2003 | Carter et al. ........... 709/224 |
| 2003/0065614 A1 | * | 4/2003 | Sweeney ............... 705/38 |
| 2004/0111188 A1 | * | 6/2004 | McClure et al. .......... 701/1 |
| 2004/0229683 A1 | * | 11/2004 | Mothwurf et al. ........ 463/26 |
| 2005/0004723 A1 | * | 1/2005 | Duggan et al. .......... 701/24 |
| 2005/0058149 A1 | * | 3/2005 | Howe .................. 370/428 |
| 2005/0086256 A1 | * | 4/2005 | Owens et al. ........... 707/103 R |

* cited by examiner

*Primary Examiner*—Madeleine A Nguyen
(74) *Attorney, Agent, or Firm*—Rader, Fishman & Grauer PLLC

(57) ABSTRACT

A system or method for managing devices (collectively "device management system") is disclosed. The device management system uses a matrix, table or other data structure technique (collectively "data structure") to configure the input parameter(s) for one or more devices. The data structure can be modified in a dynamic or static fashion to accommodate different device configurations and different device interactions. Use of the data structure can eliminate the need for multi-level "nested if" statements that are complex, deep, and difficult to modify without causing an unforeseen error. The data structure can encapsulate the hardware specific characteristics of the various devices so that the application software written for the various devices can be written independent of the hardware-specific characteristics of the devices. Thus, the data structure can act as an interface between hardware-specific characteristics relating to the various devices and various user interactions and other related factors.

13 Claims, 24 Drawing Sheets

| RKE_Unlock_IN | RKE_lock_IN | LSMA_Horn_IN | LSMA_HornOut | BIT |
|---|---|---|---|---|
| 3rd | 2nd | 1st | Input | |
| 0 | 0 | 0 | 0 | 0 |
| 0 | 0 | 1 | 1 | 1 |
| 0 | 1 | 0 | 1 | 2 |
| 0 | 1 | 1 | 1 | 3 |
| 1 | 0 | 0 | 1 | 4 |
| 1 | 0 | 1 | 1 | 5 |
| 1 | 1 | 0 | 1 | 6 |
| 1 | 1 | 1 | 1 | 7 |

Figure 15

```
const PortPinTypeDef DigInPinTbl[TotDigInNum]=
{
/*        Port#   Pin#   Type */
/*----------------------------*/
PinDef(ActLow,7,    7,   Dig_IN_TTL),   /* LSMA_Horn_IN */
PinDef(ActHigh,9,   0,   Dig_IN_TTL),   /* LSMA_IGN_ACC_IN */
PinDef(ActHigh,9,   1,   Dig_IN_TTL),   /* LSMA_WasherOn_IN */
PinDef(ActHigh,9,   4,   Dig_IN_TTL),   /* LSMA_HeadLampOn_IN */
};
```

Figure 17

```
const PortPinTypeDef DigOutPinTbl[TotDigOutNum]=
{
/*        Port#   Pin#   Type */
/*----------------------------*/
PinDef(ActHigh,1,   2,   Dig_OUT_PP),   /*5 LSMA_HornOut */
PinDef(ActHigh,3,   3,   Dig_OUT_PP),   /*6 LSMA_TrunkRelease */
PinDef(ActHigh,4,   3,   Dig_OUT_PP),   /*7 LSMA_MF_Power_F12 */
};
```

Figure 18

```
/* Input Table(gSmaITable) following name are used by Application layer */
/*--------------------------------------------------------------------*/
    #define LSMA_Horn_IN              LSMA_LogIn_17
    #define LSMA_IGN_ACC_IN           LSMA_LogIn_18
    #define LSMA_WasherOn_IN          LSMA_LogIn_19
    #define LSMA_HeadLampOn_IN        LSMA_LogIn_20
    #define LSMA_Pre_Horn_IN          LSMA_LogIn_21

/* Following is CAN message input */
    #define LSMA_DDM_Door_Ajar        LSMA_LogIn_39
    #define LSMA_DDM_Pre_Door_Ajar    LSMA_LogIn_40
    #define LSMA_DDM_Door_Lock        LSMA_LogIn_41
    #define LSMA_DDM_Door_Unlock      LSMA_LogIn_42
    #define LSMA_PDM_Door_Ajar        LSMA_LogIn_43
```

Figure 19

```
/* In the output Table(gSmaOTable), following names are owned by Application layer */
/*--------------------------------------------------------------------*/
    #define LSMA_HornOut              LSMA_LogOut_6
    #define LSMA_TrunkRelease         LSMA_LogOut_7
    #define LSMA_MF_Power_F12         LSMA_LogOut_8
    #define LSMA_Chime_State          LSMA_LogOut_9

/* Delay Index definiton used for DelayOutIdx[] array */
    #define LSMA_Trunk_Release_idx    0    /* the first element in the array */
    #define LSMA_Hron_Output_idx      1    /* the first element in the array */
```

Figure 20

```
const BitTbl3In AppTbl2=
{
    BitTbl,
    InputNum3,
    RKE_Unlock_IN,                /* 3rd */
    RKE_lock_IN,                  /* 2nd */
    LSMA_Horn_IN,                 /* 1st */
    LSMA_HornOut,                 /* Output ID */
    /* Bit 7 6 5 4 3 2 1 0 */     /* bit map start from here */
    0xFE,                         /* 1, 1, 1, 1, 1, 1, 1, 0 */
};
```

| 3rd Input | 2nd Input | 1st Input | Output |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

270

Change To →

| 3rd Input | 2nd Input | 1st Input | Output |
|---|---|---|---|
| 0 | 0 | 0 | 1 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 0 |

272

From 0xFE — Change To → From 0x01

Figure 22

```
LogicOutVal LogicTbl1Func(LogicInVal* pInputValArray,LogicID OutputID)
{
LogicOutVal RetVal=NoSetting;        /* at application layer, do not set any value */
    if((pInputValArray[0]==ON)&&     /*LSMA_VEH_SPEED_Zero==ON */
       ((pInputValArray[1]==ON)||    /*LSMA_RKE_Decklid_IN==ON or*/
        (pInputValArray[2]==ON)))    /*LSMA_Decklis_Rel_IN==ON*/
    {
        ActivateDelOut(LSMA_Trunk_Release_idx,T960MS);
    };
    return RetVal;
};

const FuncTbl3In AppTbl1=
{
    FuncTbl,                         /* table type is function table */
    InputNum3,
    LSMA_Decklis_Rel_IN,             /* 3rd */
    LSMA_RKE_Decklid_IN,             /* 2nd */
    LSMA_VEH_SPEED_Zero,             /* 1st lowest bit position */
    LSMA_TrunkRelease,               /* Output ID */
    LogicTbl1Func,                   /* logical function address */
};
```

SYSTEM AND METHOD FOR MANAGING DEVICES

BACKGROUND OF THE INVENTION

The invention is a system or method for managing devices (collectively a "device management system" or simply the "system").

Enhancements in the functionality of various complex and sophisticated device configurations are not limited to the confines of the devices themselves. Increasingly sophisticated technological configurations require many different devices to act in concert with each other in a highly integrated manner. Different "black box" or even "plug-and-play" components can be used in a highly flexible and even interchangeable manner while at the same time, the aggregate systems utilizing those same components can be subjected to highly rigorous integration requirements. In a sophisticated configuration of devices, the integrated functionality of the aggregate system can substantially exceed the sum of its parts. Such integrated functionality can also be an important way to enhance the functionality of each individual device, and the ways in which human beings interact with those devices.

It is often difficult to implement highly integrated device configurations in an efficient, error-free, and timely manner. Programming logic relying heavily on complex "nested if" statements is typically used to implement various decision-trees that embody integrated configuration attributes. For example, if device A has status m, device B has status n, and device C has status o, the system can be configured to use input p to generate output q from device D. A change of even a single variable can generate a potentially radically different outcome. Thus, the development of new configurations through the modification of old configurations can often fail to provide time, cost, and accuracy advantages. The more numerous the devices and the more subtle the potential configuration distinctions, the greater the likelihood for error, inefficiency, and a cost prohibitive implementation processes.

The implementation of an enhanced system or method for device management is actively and affirmatively hampered by differences in the technical communities involved in the development of computer software. There are significant cultural, historical, and educational differences between software development in the context of general purpose computing, and software development in the context of embedded environments such as programmable logic devices, embedded computers, and other smart devices (collectively "smart devices") with purposes beyond the functionality of running computer software.

SUMMARY OF THE INVENTION

The invention is a system or method for managing devices (collectively "device management system" or simply the "system").

The system can use a configuration component to configure one or more input parameters relating to one or more functions performed by one or more devices. In some embodiments of the system, a wide variety of different types of devices can be managed by the system, including programmable logic devices, embedded computers, finite state machines, and other types of devices. The configuration component can use a matrix, table, or other form of data structure (collectively "data structure") to reduce the need for utilizing programming logic that includes nested if statements. In some embodiments, the configuration component can include a separate data structure for input parameters, a separate data structure for output parameters, and a separate data structure for defining the relationships between features relating to the various devices being configured.

The system can be implemented by using a virtual layer as an interface between an interaction layer and a hardware layer. The interaction layer can receive one or more interaction attributes from human beings and other users through one or more interface tools. The hardware layer can include the various devices being configured by the system, including the particular input values needed to make those devices function in the desired manner. The use of the virtual layer can shield the interaction layer from the hardware-specific information relating to the hardware layer, rendering the interaction layer "platform-independent" to a significant degree.

The system can be implemented in the form of various subsystems. A functionality subsystem can include the one or more functions performed by the one or more devices managed by the system. An interactions subsystem can capture the intentions and instructions of human beings and other users so that the appropriate input value(s) can be provided to the corresponding function(s). A conversion subsystem can be used to convert the interaction information captured by the interaction subsystem and convert that information into the appropriate input parameters for the functionality subsystem.

BRIEF DESCRIPTION OF THE DRAWINGS

FIG. 15 is an example of a feature matrix that can be included in a configuration component implemented in a vehicle embodiment of a device management system.

FIG. 17 is an example of a source code excerpt for mapping input information from the hardware level to the input matrix.

FIG. 18 is an example of a source code excerpt for mapping output information from the output matrix to the hardware level.

FIG. 19 is an example of a source code excerpt for mapping input information from the input matrix to the feature matrix.

FIG. 20 is an example of a source code excerpt for mapping output information from the feature matrix to the output matrix.

FIG. 21 is an example of a source code excerpt that defines the values for a feature matrix.

FIG. 22 is an example of a modification being made to a feature matrix.

FIG. 23 is an example of a source code excerpt for populating an output matrix with state-related information.

DETAILED DESCRIPTION

Figure 1:
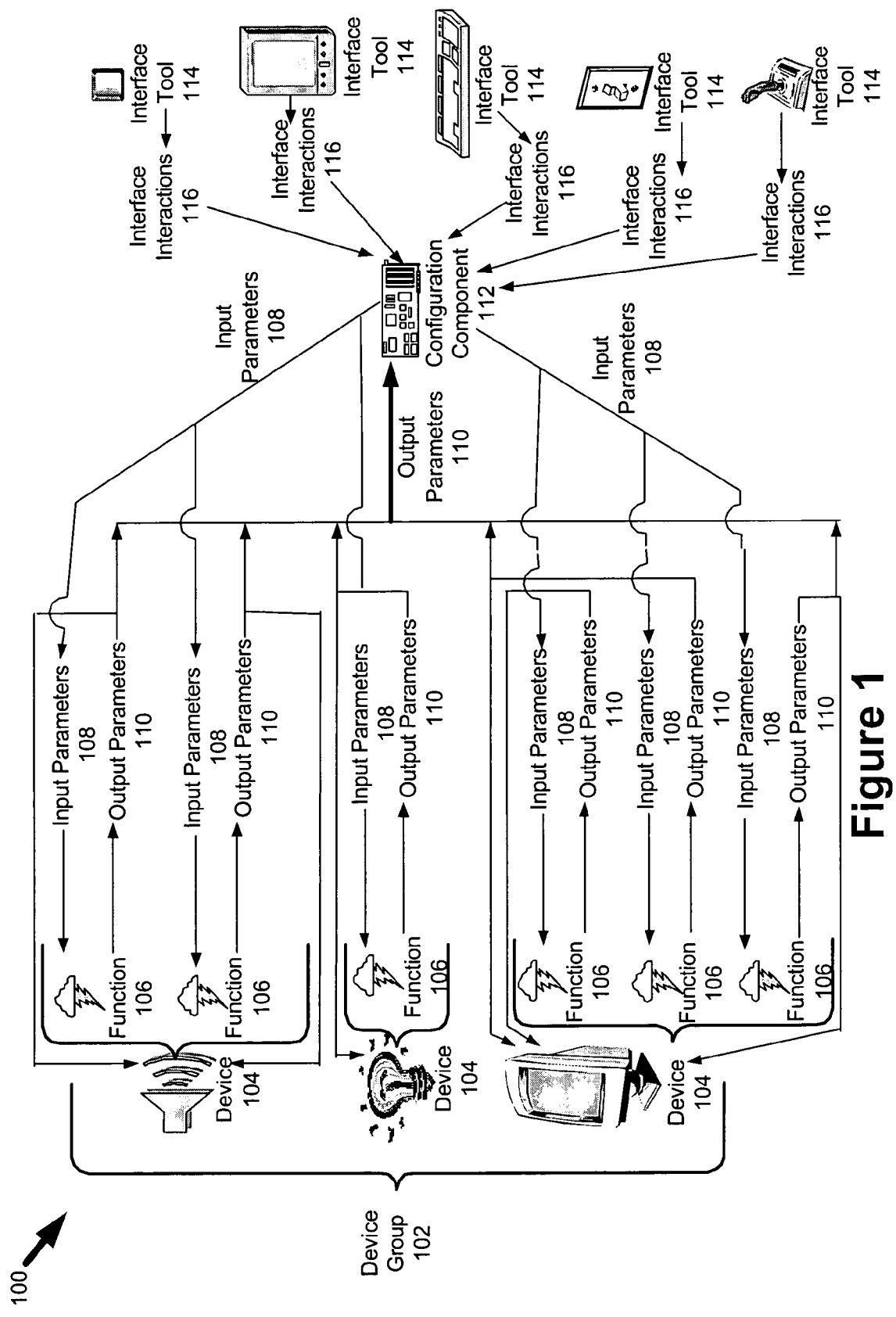
FIG. 1 is a multi-threaded process flow diagram illustrating an example of some of the elements and components that can be included in some embodiments of a device management system.

The invention is a system or method for managing devices (collectively a "device management system" or simply the "system"). The device management system provides the ability to easily configure one or more devices with respect to one or more input parameters and one or more output parameters.

Enhancements in the functionality of various complex and sophisticated device configurations are not limited to the confines of the devices themselves. Increasingly sophisticated technological configurations require many different devices to act in concert with each other in a highly integrated manner. Different "black box" and even "plug-and-play" components can be used in a highly flexible and even interchangeable manner while at the same time, the aggregate device-implementing systems utilizing those same components can be subjected to highly rigorous integration requirements. In a sophisticated configuration of devices, the integrated functionality of the aggregate system can substantially exceed the sum of its parts. Such integrated functionality can also be an important way to enhance the functionality of each individual device, and the ways in which human beings interact with those devices.

In the prior art, it is often difficult to implement highly integrated device configurations in an efficient, error-free, and timely manner. Programming logic relying heavily on complex "nested if" statements is typically used to implement various decision-trees that embody integrated configuration attributes. For example, if device A has status m, device B has status n, and device C has status o, the system can be configured to use input p to generate output q from device D. A change of even a single variable can generate a potentially radically different outcome. Thus, the development of new configurations through the modification of old configurations can often fail to provide time, cost, and accuracy advantages. Prior art techniques for modifying device configurations do not provide a suitable alternative to "reinventing the wheel" even with respect to configurations that are very similar to each other. The more numerous the devices and the more subtle the potential configuration distinctions, the greater the likelihood for error, inefficiency, and a cost prohibitive implementation processes. Such impediments preclude many different applications of integrated device configurations.

The system can be utilized in many different environmental contexts. For example, in a building environment, such as a residence or office, there are many user-friendly processing rules that could be created and implemented to control how devices interact with each other or modify their respective behavior with respect to other devices. For example, it may be desirable for radio, stereo, television, and other recreational devices to be configured in such a manner as to automatically mute or reduce volume when a human being picks up a telephone to respond to a phone call or upon the activation of a smoke or intrusion alarm.

In a vehicle environment, such as an automobile, train, boat, motorcycle, or airplane, there are many instances where it may be desirable for the status of one device to impact the functioning of a different device. For example, it might be a useful safety precaution for the horn and/or lights to automatically activate if a vehicle undergoes braking deceleration of a particular magnitude. The value of integrating device functionality is not limited to vehicle environments or to building environments. Virtually any context utilizing two or more devices can potentially benefit from integrated device functionality. In some circumstances, it is the manufacturer who can determine how various devices will function within an integrated device configuration. In other circumstances, the user of the various devices can be allowed to implement their own preferences and desires.

There are significant challenges to meaningful and efficient device integration in the prior art. Many different devices are manufactured as "black boxes" without any cognizance of possible integration possibilities. The number of different combinations is potentially limitless, often rendering any particular configuration of devices difficult to foresee. In many instances, each particular device configuration will require some degree of customized integration information. The system provides a better mechanism and method for creating, modifying, and deleting configuration information.

The system provides a means and method for the accurate, timely, and efficient configuration of devices. The system can use one or more computer, computational, and/or electronic components (collectively "configuration components") to house the configuration information associated with a particular set of devices. Such components can utilize programming logic (in either a software or hardware format) to integrate the inputs and outputs of various devices so that the functionality of one device within the group is appropriately impacted or affected by the status and functionality of other devices in the same group. Typically, such programming logic involves "nested if" statements that are at least several levels deep. For example, if device A has status m, device B has status n, and device C has status o, then input p can generate output q with respect to device D. In the previous example, entirely different branches of outcomes can be configured to occur when device A has a status of i, j, k, or l. Any change in elements (i) through (iv) can result in a different output being generated from device D. In the prior art, configurations of even small or medium numbers of devices can be difficult to accurately implement given the complexities of the nested if statements in the programming logic. Such difficulties are particularly troublesome to overcome when configuration attributes are to be modified, either to accommodate a slightly different operating environment, or in an attempt to improve the desirability of the device integration in the original environment.

The system can overcome the difficulties in the prior art by using a different strategy to create, update, delete, and store configuration information. Instead of relying on complex and hard to maintain nested "if" statements that result in spaghetti code, the system can use one or more matrices, tables, or other data structures (collectively "data structures") to manipulate configuration information in a manner that is more meaningful to human programmers. Such data structures can provide a map of configuration information, identifying which combinations of inputs result in particular outputs and outcomes with respect to a particular device.

I. Introduction of Elements

FIG. 1 is a multi-threaded process flow diagram illustrating an example of some of the elements and components that can be included in some embodiments of a device management system 100.

A. Devices

A device 104 is potentially any mechanism, apparatus, structure, or application (collectively "device") capable of performing a function 106 that can be configured by the system 100. Examples of devices 104 include but are not limited to: lamps and other forms of lighting; brakes; steering wheels; air conditioners and other environmental control mechanisms; printers; scanners; CD players; dish washers and other household appliances; DVD players; personal digital assistants (PDAs); cell phones; clocks; video cameras; engines; furniture; speakers and other sound generating items; computers; sensors; latch mechanisms; locks; doors; speed control mechanisms; snow removal equipment; automated navigation applications; global positioning applications; landscaping equipment; and virtually any other item capable of performing one or more functions 106.

The functionality of a device 104 typically relates to characteristics or attributes of the device 104. Different types or categories of devices 104 can be defined on the basis of such characteristics or attributes. There are many different categories of devices 104, including but not limited to mechanical devices, structural devices, electrical devices, computational devices, chemical devices, biological devices, and energy devices. A device 104 such as a lock that performs a function based primarily on mechanical characteristics of the device 104 can be referred to as a mechanical device. Devices 104 such as lamps and other light-generating mechanisms typically generate light on the basis of electrical attributes, and thus such devices 104 can be referred to as electrical devices. Examples of structural devices include ramps, bridges, and door stoppers. Computational devices are devices 104 that utilize a computer such as a central processing unit to perform the functionality of the device 104. Chemical devices perform their functions based predominantly on the chemical properties of a substance or environment. Biological devices such as plants, microorganisms, and other typically organic material perform functions based on the biological attributes of the device 104. Energy devices such as batteries and turbines can provide energy or power. A single device 104 can belong to more than one category of devices 104. For example, a battery can be classified as both an energy device and a chemical device while many consumer electronics devices can be classified as both electrical devices and computation devices. A jack from a car could be considered both a structural device and a mechanical device.

In many embodiments of the system 100, some type of electrical or computation component is associated with each device 104, including devices 104 that would not otherwise be classified as electrical devices or computational devices. Such a component allows the system 100 to interact with and configure those devices 104. In some embodiments, a configuration component 112 that can interact directly with the device 104 is incorporated into the system 100. The configuration component 112 is discussed in greater detail below.

B. Device Groups

A device group 102 is a collection of one more devices 104 that from the perspective of the system 100, can impact the desired functionality and configurations of one another. In some embodiments, of the system 100, there may be multiple device groups 102 within a single host mechanism, such as an automobile or other vehicle. In a fully integrated embodiment of the system 100, there is only one device group 102, with each device 104 being potentially influenced by each and every combination of status and functionality associated with the other devices 104 in the device group 102. In embodiments that are not fully integrated, certain devices 104 may have absolutely no impact or interactions with certain other devices 104, and thus those devices 104 can be organized into distinct and separate device groups 102.

If a particular embodiment of the system 100 includes more than one device group 102, then devices can be categorized into a device group 102 based on some degree of similarity with the other devices 104 in the device group 102. In some embodiments, a device 104 can belong to more than one device group 102. In other embodiments, a device 104 may only belong to a single device group 102.

In embodiments of the system 100 that are used to configure devices 104 in a vehicle, the device groups 102 of the system 100 can include one or more of the following device groups 102: an engine control device group, a transmission control device group, a power seat device group, an instrument cluster device group, an environmental control device group, an overhead console device group, and a battery device group.

In a preferred embodiment, the devices 104 are finite state machines.

C. Function

A function 106 is an action or series of actions performed by the device 104 that performs or invokes the function 106. Just as devices 104 can be categorized by their relevant characteristics, the functions 106 invoked by the various devices 104 can also be categorized in accordance with attributes relating to the function. Thus, many functions can be classified as structural, mechanical, electrical, computational, chemical, biological, or energy functions.

As illustrated in FIG. 1, a single device 104 can perform a wide variety of functions 106. Different devices 104 can perform a different number of functions 106. For example, a consumer electronics device 104 will typically have many functions 106, while a structural device 104 may not possess any functions 106 at all, and instead, merely possess a status.

Functions 106 receive one or more input parameters 108 that determine the "who, what, why, when, and how" the function 106 is to be configured or invoked. Functions 106 generate one or more output parameters 110 in the performance of their functionality. The output parameter 110 for one function is often the input parameter 108 for another function. The status of a device 104 or function 106 can also serve as the input parameter 108 for a function.

In a preferred embodiment, the software architecture used to support the functionality of the functions 106 is based on a multi-tasking pre-emptive kernel that is capable of rescheduling the processing of various functions 106 based on pre-defined or even system-generated priorities. Thus, tasks such as functions 106 can be rescheduled after each interrupt service routine (ISR).

D. Input Parameters

An input parameter 108 is potentially any information from outside the device 104 hosting the function 106 that can influence the functionality or configuration of the function 106. Input parameters 108 can include data relating to user activities, captured in the form of an interface interaction 116, described below. As illustrated in FIG. 1, input parameters 108 can originate from any device 104 or function 106 within the device group 102. Input parameters 108 can take the form of any data structure or data type that is capable of being processed by a configuration component 112. The configuration component 112 is the mechanism for communicating information throughout the device group 102, and is described below.

In the example of an office building embodiment, input parameters 108 for a temperature control device 104 could include a date, a time, a current household occupancy, a price related to fuel and energy consumption, and a matrix of desired instructions given the various parameters.

Input parameters 108 can include both digital input and analog input. In embodiment of the system 100 that utilizes a multi-tasking pre-emptive kernel architecture, the input parameters 108 (as accessed from the input matrix discussed below) can be "polled" periodically. Network messages are interrupts that can also serve to update input parameters as stored in the input matrix.

E. Output Parameters

An output parameter 110 is potentially any information or status originating from within the device 104 hosting the function 106 that can influence the functionality or configuration of other functions 106 or devices 104 within the device group 104. Output parameters 110 can include data relating to the status of a device 104 or function 106, such as a state of being on, off, etc. As illustrated in FIG. 1, output parameters 110 can be transmitted to any device 104 or function 106 within the device group 102 through the mechanism of the configuration component 112 discussed below. Output parameters 108 can take the form of any data structure or data type that is capable of being processed by a configuration component 112.

In the example of consumer electronics/entertainment center embodiment, output parameters 110 can include: the volume setting for a device 104 or function 106; an on/off status; the type of media being played (DVD, CD, VHS, etc); the current length of playing time; the amount of time until a particular performance unit is completed, etc.

F. Configuration Component

A configuration component 112 is potentially any mechanism or method by which the system 100 collects output parameters 110 from the various devices 104 and functions 106 associated with a particular device group 102, and in turn generates or distributes input parameters 108 relating to the various devices 104 and functions 106 associated with the particular device group 102. The configuration component 112 can be implemented in a wide variety of formats, including a distributed-processing format that involves more than one physical component.

As indicated in FIG. 1, the configuration component 112 is also responsible for capturing interface interactions 116 captured through various interface tools 114. Interface interactions 116 embody instructions and interactions with human beings and other users, becoming potential input parameters 108 for the various functions 106 and devices 104.

The configuration component 112 allows the system 100 to integrate input and output information with respect to the devices 102 and interface tools 114.

G. Interface Tools

An interface tool 114 is potentially any apparatus, application, or tool that allows human beings (and other forms of users such as robots) to provide a device 104 or function 106 with operating instructions. Examples of potential interface tools 114 include but are not limited to: the "play" button on a DVD player; the control buttons on a PDA; a keyboard; a light switch; a joystick; the speed control button on a steering wheel; a steering wheel; the break pedal; a lock door button; and a wide variety of other mechanisms.

Interface tools 114 can be part of device 104, and interface tools 114 can also be totally distinct and separate from any particular device 104 in the device group 102. A single interface tool 114 can potentially support a wide variety of different interface interactions 116.

H. Interface Interactions

An interface interaction 116 is the representation or information captured by the system 100 as a result of the manipulation or use of the interface tool 114. The interface interaction 116 associated with a button will typically be some type of on/off value. A volume setting interface tool 114 will likely involve a range of values for which a volume can be set. The interface interactions 116 associated with a keyboard, joystick, or mouse can include the aggregate of all the activities performed using those tools 114.

As illustrated in FIG. 1, interface interactions 116 can become input parameters 108 for multiple devices 104 and functions 106.

I. Host Mechanism

All of the devices 104, functions 106, input parameters 108, and output parameters 110 in the example of FIG. 1 are integrated together by the configuration component 112. In a preferred embodiment, there is one configuration component 112 for each device group 102. In a fully integrated embodiment, there is only one device group 102, because each device 104 can potentially take into consideration and be influenced by a variety of complex combinations involving all of the other devices 104.

Just as a single device 104 can support one or more functions 106, and a device group 102 can involve more than one device 104, there can be multiple device groups 102 within a single host mechanism.

Figure 2:
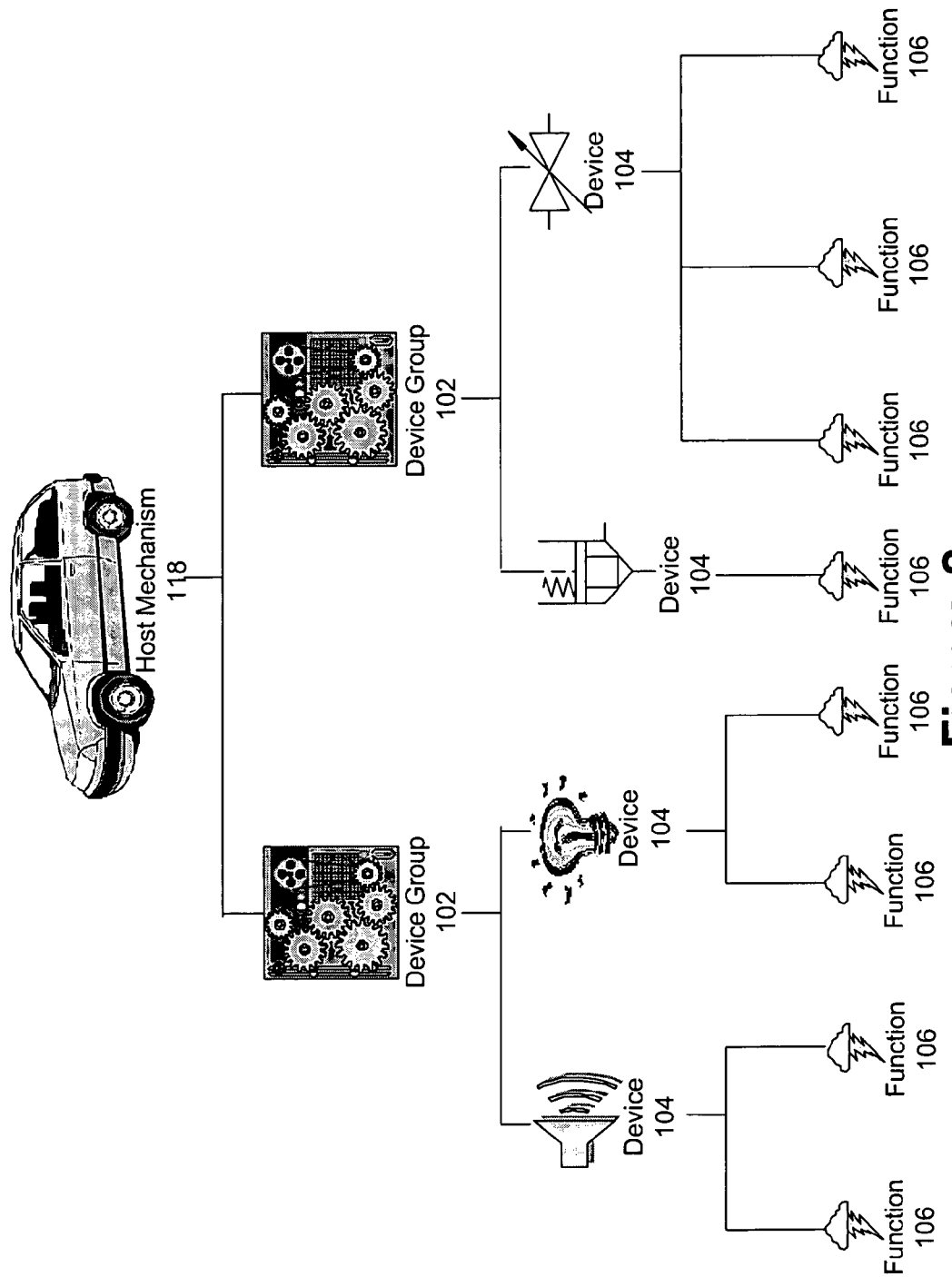
FIG. 2 is a relationship hierarchy diagram illustrating an example of the various elements that can be incorporated into a single host mechanism utilizing an embodiment of a device management system.

FIG. 2 is a relationship hierarchy diagram illustrating an example of the various elements that can be incorporated into a single host mechanism 118 utilizing an embodiment of a device management system 100.

A host mechanism 118 is potentially any operating environment of the system 100. In a vehicle embodiment, the host mechanism 118 is a vehicle. In an office building environment, the host mechanism 118 is the office building. The host mechanism 118 can involve only a single device group 102 in the context of a fully integrated embodiment, or a great number of different device groups in various non-fully integrated embodiments. Each device group 102 is associated with one host mechanism 118.

In the example illustrated in FIG. 2, the host mechanism 118 includes two device groups 102, and each device group 102 includes two devices 104. The different devices 104 perform a different variety and number of functions 106. The example in FIG. 2 is illustrative only. In many embodiments of the system 100, the number of devices 104 and functions 106 would likely be too voluminous to be shown in a single figure.

J. Data Structures Used by the Configuration Component

The configuration component 112 provides the mechanism by which different parameters are appropriately mapped and directed for use by the various devices 104. The configuration component 112 can use a wide variety of different data structures, such as tables, matrices, arrays, and other forms of organizing information (collectively "data structure" or "matrix").

Figure 3:
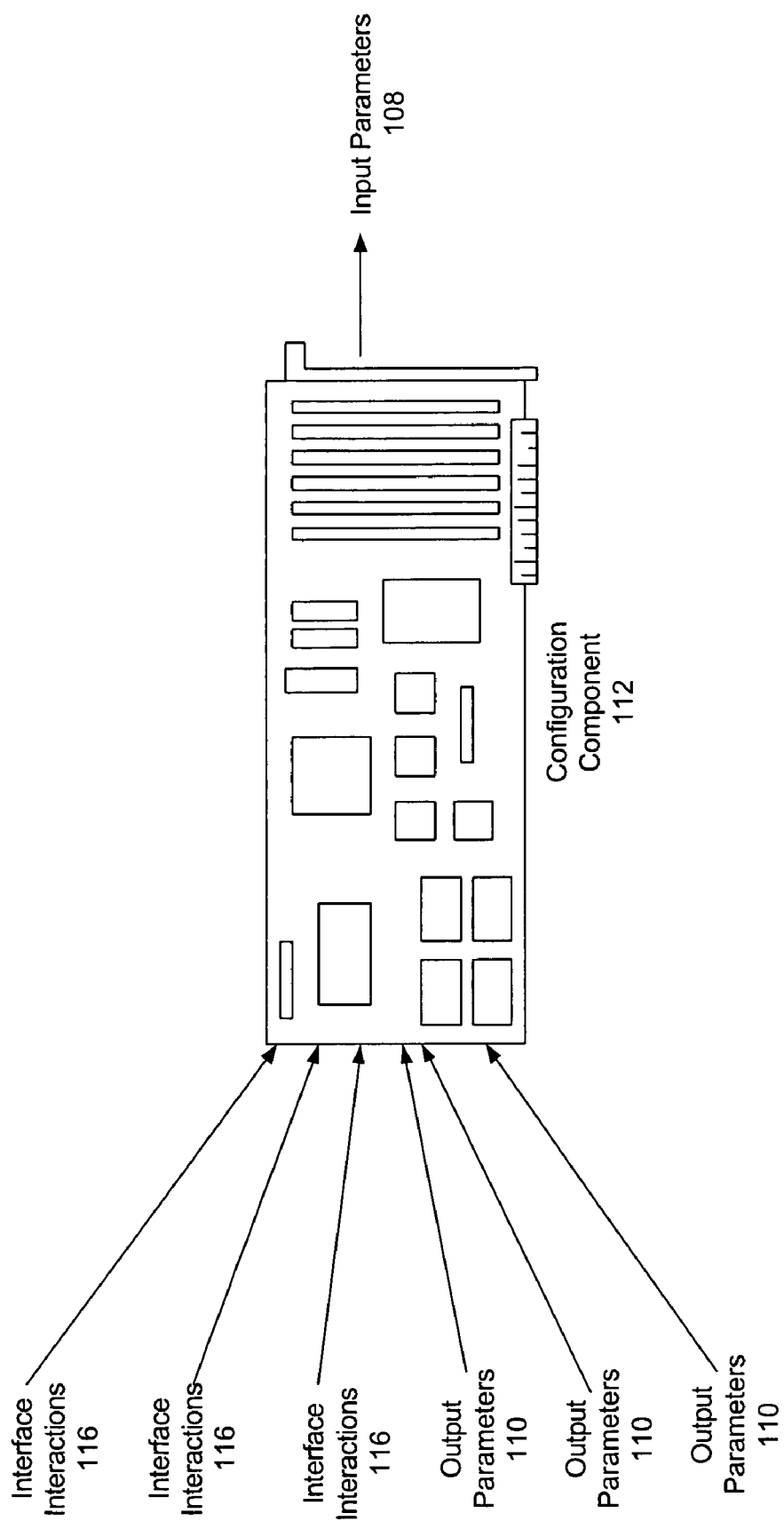
FIG. 3 is an input/output diagram illustrating an example of a single input parameter being generated for a particular function for a particular device, from a combination of multiple interface interactions and output parameters received from other devices.

FIG. 3 is an input/output diagram illustrating an example of a single input parameter 108 being generated for a particular function 106 for a particular device 104 from a combination of multiple interface interactions 116 and output parameters 110 generated from other devices 104. In a fully integrated and normalized embodiment, a change in even one parameter received by the configuration component 112 can potentially alter the input parameter 108 transmitted by the configuration component 112. Thus, in a preferred embodiment, the configuration component can use various matrices to map various parameters for the purpose of being utilized by a particular device 104 or function 106.

Figure 4:
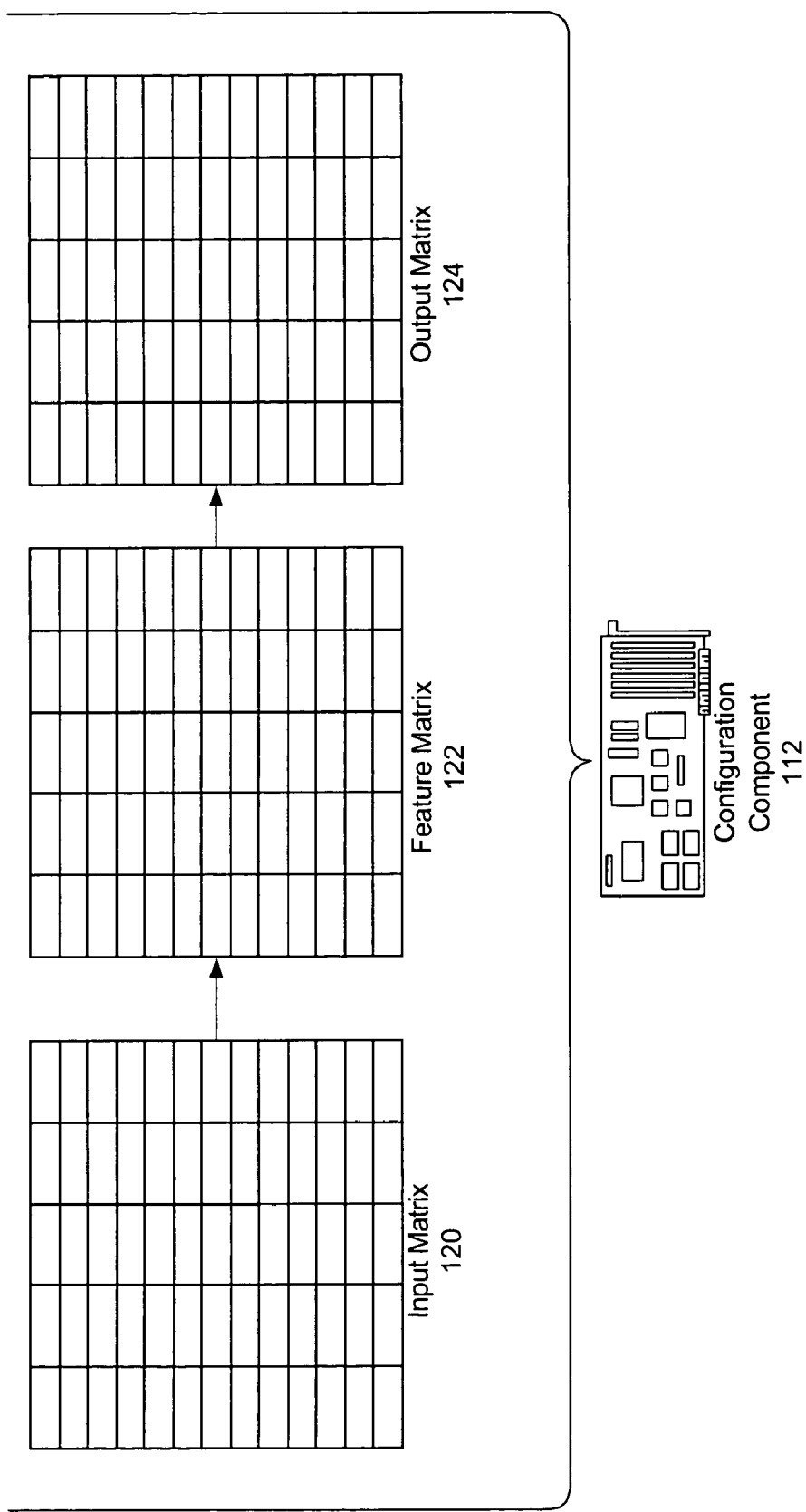
FIG. 4 is a process flow diagram illustrating an example of different matrices being utilized within the configuration component.

FIG. 4 is a process flow diagram illustrating an example of different matrices being utilized within the configuration component 112. In the example disclosed in FIG. 4, the configuration component 112 uses a dynamically created and populated input matrix 120 to cross-validate values in accordance with a feature matrix 122 (which can also be referred to as a "truth table" 122), the output of which is transmitted to a dynamically created and populated output matrix 124. By mapping input (on the input matrix 120), operating rules (on the feature matrix 122), and output (on the output matrix 124), the system 100 avoids the necessity of relying on complicated "nested if" statements that require modification each time the implementation is adjusted in even a minor way. The use of matrices or other data structures minimizes the need for modifying programming logic, because the instructions can be written to the data structures, and the software can be "played" to the data structures.

The various data structures are typically implemented in a digital format, which can be supported by processing implemented through software, hardware, or a combination of hardware and software.

1. Input Matrix

An input matrix 120 is the data structure by which input parameters 108 for devices 104 and functions 106 are gathered together for submission to the various devices 104 and functions 106. The input matrix 120 can also be referred to as an input table. In many embodiments, the input matrix 120 can be created dynamically, with the system 100 automatically creating the appropriate number of variables, rows, and columns.

In a preferred embodiment, a single input matrix 120 supports the function of loading input parameters 108 for the entire device group 102.

2. Feature Matrix

A feature matrix 122 is the data structure that stores and enforces the operating rules governing which combination of input parameters 108 are to result in one or more particular output parameters 110. Unlike the input matrix 120 and the output matrix 124, the feature matrix 122 is typically pre-defined, and thus is not dynamically set or updated. If the operating rules within the device group 102 are to be changed, then it is the feature matrix 122 that needs to be changed. No other component needs to be changed, which means that no programming instructions such as source or object code needs to be changed. For example, if a human being responsible for the functionality of the horn within the vehicle were to decide that the engine should not need to be running in order for the horn of the vehicle to work, the appropriate change could be made to the feature matrix 122, and no other change would be required. The ability to easily make modifications to the operating rules implemented by the configuration component 112 allows designers to copy the software and programming logic of other designs, and use them to support different designs, with changes only needing to be made to the feature matrix 122. Thus, the system 100 could be implemented in one type or design of vehicle, and with by merely changing the feature matrix 122, the system 100 could be implemented into another type or design of vehicle, even though that vehicle incorporates a vastly different set of operational rules embodied in the feature matrix 122. No lines of source or object code would need to be changed.

In a preferred embodiment, a single feature matrix 122 is a static data structure that controls the operating rules for the entire device group 102. The feature matrix 122 can also be referred to as a feature table, a truth table, a static custom feature table, or a custom feature table.

3. Output Matrix

An output matrix 124 is the mechanism by with the various devices 104 and functions 106 receive their input parameters 108 from the configuration component 112. Different locations within the output matrix 124 can map to different inputs for different devices 104. The output matrix 124 can also be referred to as an output table, an output state table, or a dynamic output state table. In many embodiments, the output matrix 124 can be created dynamically, with the system 100 automatically creating the appropriate number of variables, rows, and columns.

Figure 5:
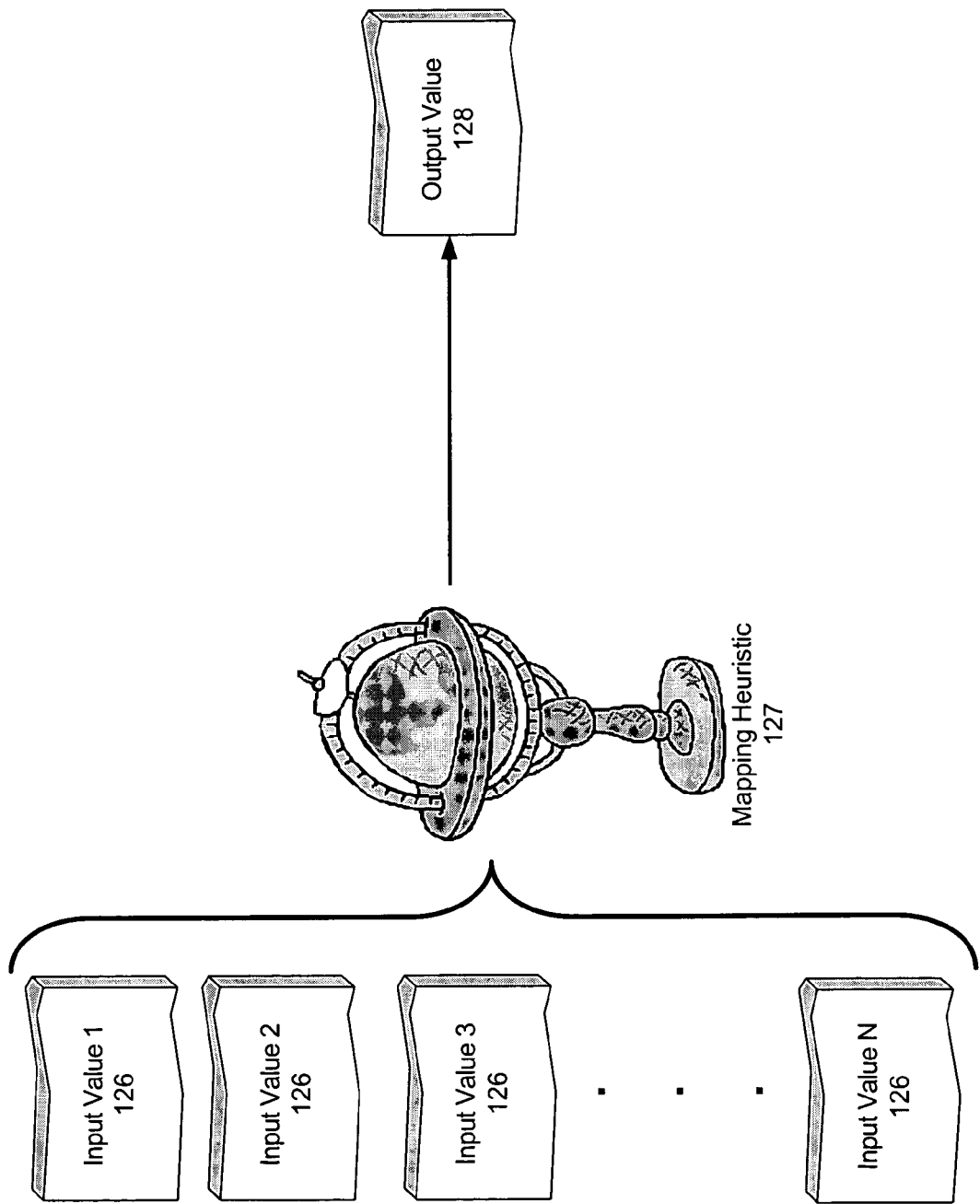
FIG. 5 is an input/output diagram illustrating an example of a single output value being generated by a mapping heuristic from a combination of multiple input values.

In a preferred embodiment, a single output matrix 124 can support the function of making input parameters 108 available to an entire device group 102. FIG. 5 is an input/output diagram illustrating an example of a single output value 128 being generated by a mapping heuristic 127 from a combination of multiple input values 126. An input value 126 is an input parameter 108 that has been set to a particular value. Similarly, an output value 128 is an output parameter 110 that has been set to a particular value. A mapping heuristic 127 is potentially any process that allows the configuration component 112 to utilize the data structures discussed above, to map inputs and outputs. In many respects, the mirror image of the mapping heuristics 127 that is used in conjunction with the output matrix 124 can be used in conjunction with the populating of the input matrix 120.

II. Subsystem-Level View

Figure 6:
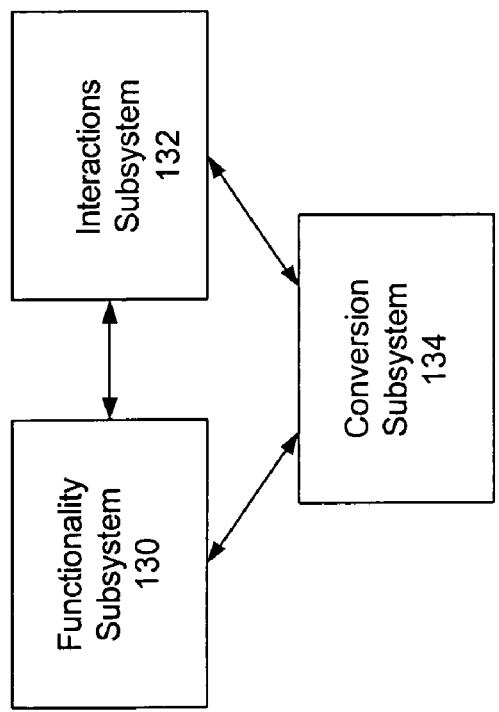
FIG. 6 is a block diagram illustrating an example of a subsystem-level view of a device management system.

The system 100 can be represented as being made up of various subsystems. FIG. 6 is a block diagram illustrating an example of a subsystem-level view of a device management system 100.

A. Functionality Subsystem

A functionality subsystem 130 is used to manage the functionality provided by the various devices 104 configured by the system 100. The functionality subsystem 130 can include a wide variety of different device groups 102, devices 104, and functions 106. In many embodiments of the system 100, the functionality subsystem 130 can provide the means to create, add, delete, install, uninstall, update, and otherwise modify the functions 106 used by the various devices 102. As discussed above, functions 106 can be associated with input parameters 108 and output parameters 110.

With respect to many hardware-oriented devices 104, such as programmable logic devices, embedded computers, and other forms of devices 104 used in many industrial applications, the format on the input parameters 108 and output parameters 110 can be hard-coded into the device 104 or function 106 by the manufacturer of the device 104. This can present a challenge with regards to data integration, the potential interchange of components in a "plug and play" architecture, and modifications to the device configuration generally. Such problems can be addressed by a conversion subsystem 134, described in detail below.

In making device functionality "platform independent" it can be advantageous for the conversion subsystem 134 to support a "virtual" view of the parameter while the functionality subsystem 130 necessarily uses a "hardware" view of the same parameter.

B. Interactions Subsystem

An interactions subsystem 132 is the means by which users, send interface interactions 116 to the system 100 through the use of various interface tools 114. The interactions subsystem 132 is the means by which human beings and other potential users such as robots interact with the devices 104 in the host mechanism 118.

The interactions subsystem 132 can be configured to receive kinetic interface interactions 116, such as the click of a mouse or the push of a button, as well as acoustic interactions such as oral instructions captured by voice recognition technology, and optical interactions such as a light pen. In some embodiments of the system 100, the interactions subsystem 132 can include the use of various sensors for capturing interface interactions 116 automatically, without the need for users to consciously decide to interact with the various devices 104 configured by the system 100.

In some embodiments of the system 100, the interactions subsystem 132 is also responsible for capturing interactions between a software application or other type of application, and the system 100 or group of devices 102.

Interface interactions 116 in a vehicle embodiment of the interactions subsystem 132 can include but are not limited to: a shifting of a transmission; a locking of a door; a turning on of a consumer electronic device; a setting of a speed value of a speed control; a moving of a seat; an opening of a window; and the closing of a window.

C. Conversion Subsystem

A conversion subsystem 134 is the means by which the interface interactions 116 of the interactions subsystem 132 are converted into a format that can be recognized and acted upon by functionality subsystem 130.

In a preferred embodiment, the conversion subsystem 134 includes the input matrix 120, feature matrix 122, and output matrix 124, discussed both above and below. It is the conversion subsystem 134 that shields the logical requirements and expectations of the interactions subsystem 132 from the more platform dependent and hardware intensive functionality subsystem 130. If a user of the system 100 desires to create new operating rules for a particular host mechanism 118 such as a new line of vehicles from the old operating rules associated with a prior line of vehicles, it would be possible in many circumstances to simply migrate the functionality subsystem 130 and the interactions subsystem 132 as they previously existed. Potentially, only the conversion subsystem 134 would require any modification, and more specifically, only the feature matrix 122 within the conversion subsystem 134 would require any such modification.

D. Mapping Subsystem

Figure 7:
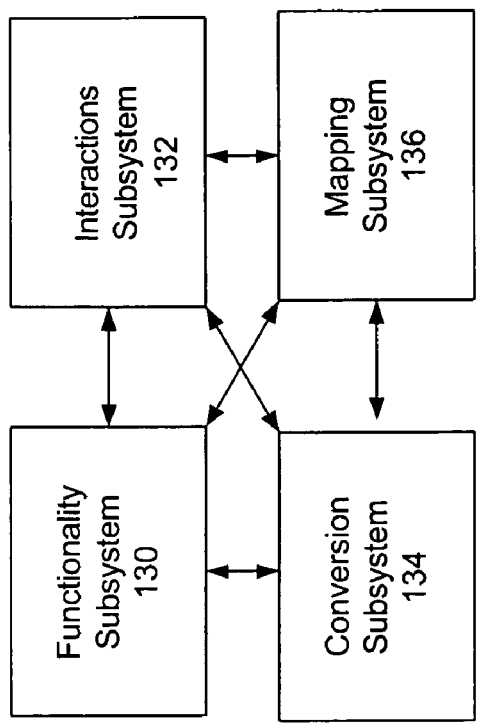
FIG. 7 is a block diagram illustrating an example of a subsystem-level view of a device management system.

FIG. 7 is a block diagram illustrating an example of a subsystem-level view of a device management system 100 that includes a mapping subsystem 136. The mapping subsystem 136 populates the input matrix 120 with input parameters 108 as discussed above. The mapping subsystem 136 also propagates the output parameters 110 from the output matrix 124.

III. Process-Flow Views

A. Implementation Method

Figure 8:
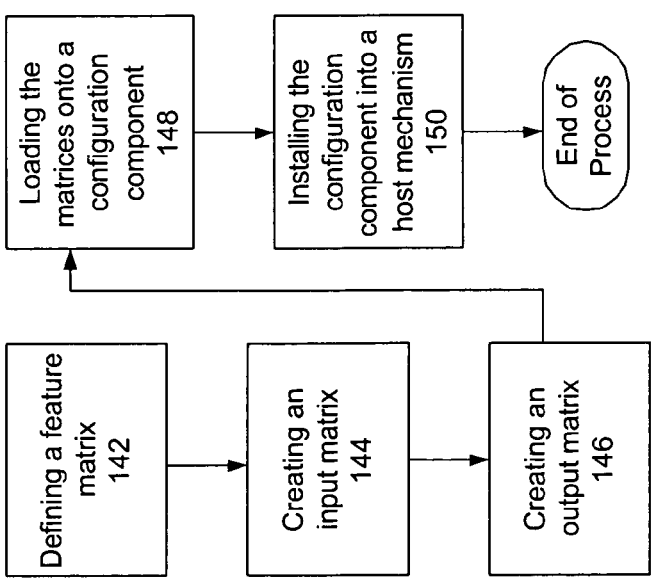
FIG. 8 is a flow chart illustrating an example of a method for implementing a device management system.

FIG. 8 is a flow chart illustrating an example of a method for implementing a device management system 100. Different embodiments of the system 100 may involve a different number of steps, different types of steps, and steps performed in a different order.

At 142, a feature matrix 122 is defined. This typically involves defining the operating rules for the particular configuration. For example, if the horn of a vehicle is not supposed to function unless the key is in the ignition, then the feature matrix 122 can be defined in such a way as to support that limitation. What the prior art would use "nested if" statements to configure, the implementer of the system 100 could use the feature matrix 122 to configure.

At 144, an input matrix 120 is created. In a preferred embodiment, the size of the input matrix 120 is defined dynamically, and thus the input matrix 120 can in some respects be said to be "created" in real-time as the system 100 is in use. However, in the case of a dynamically defined input matrix 120, the creation of a dynamically modifiable input matrix 120 can be said to occur at 144 for installation at 148, as discussed below At 146, an output matrix 124 is created. In a preferred embodiment, the size of the output matrix 124 is defined dynamically, and thus the output matrix 124 can in some respects be said to be "created" in real-time as the system 100 is in use. However, in the case of a dynamically defined output matrix 124, the creation of a dynamically modifiable output matrix 124 can be said to occur at 146 for installation at 148, as discussed below.

At 148, the feature matrix 122, the input matrix 120, and the output matrix 124 created above, are installed into the configuration component 112. This can be done using a wide variety of techniques known in the art of loading data structures and data storage mechanisms onto non-general purpose computer systems.

At 150, the configuration component 112 is installed into the desired host mechanism 118. Subsequent modifications to the configuration embedded in the configuration component 112 can be accomplished simply by modifying the feature matrix 122.

B. Method for Modifying a Device Configuration

Figure 9:
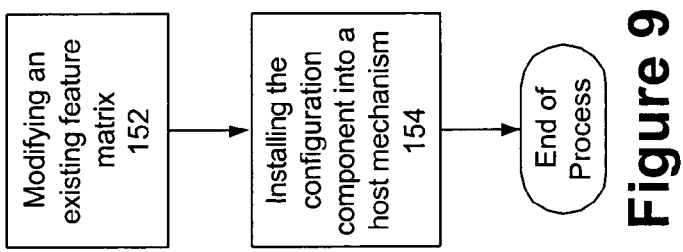
FIG. 9 is a flow chart illustrating an example of a method for modifying the configuration of one or more devices.

FIG. 9 is a flow chart illustrating an example of a method for modifying the configuration of one or more devices 104. Different embodiments of the system 100 may involve a different number of steps, different types of steps, and steps performed in a different order.

At 152, the configuration relating to one or more functions 106 and/or one or more devices 104 is modified by a making the corresponding change to the feature matrix 122.

At 154, the desired modification is implemented by installing the "new" feature matrix 122 into the prior configuration component 112. In some embodiments, this update process can occur while the configuration component 112 is still installed within the host mechanism 118. If not, then the configuration component 112 will need to be re-installed in the host mechanism 118 before the end of the update process.

C. Method for Managing Devices

Figure 10:
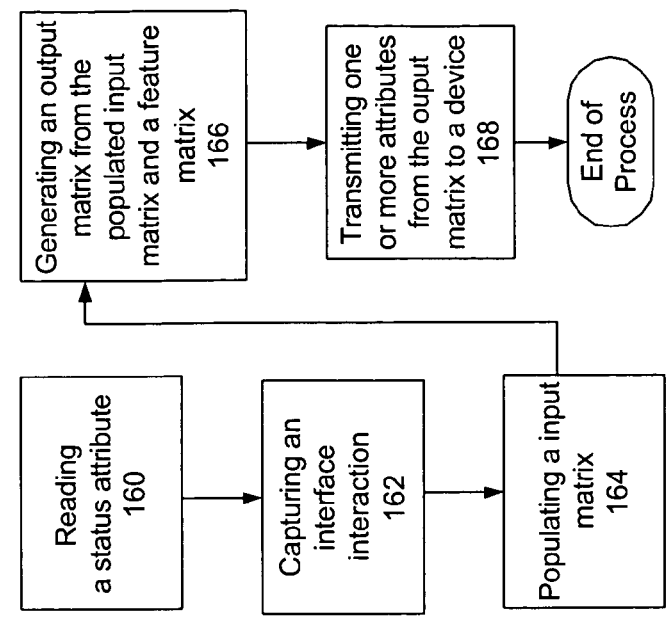
FIG. 10 is a diagram illustrating an example of a method for using a device management system to transmit input information to one or more devices.

FIG. 10 is a diagram illustrating an example of a method for using a device management system 100 to transmit input information to one or more devices. Different embodiments of the system 100 may involve a different number of steps, different types of steps, and steps performed in a different order.

At 160, a status attribute or other form of output parameter 110 from one function 106 is accessed as a potentially relevant input parameter 108 for another function 106.

At 162, an interface attribute 162 is captured from one or more interface tools 114.

At 164, an input matrix 120 is populated. As discussed above and below, the loading of output and input matrices can be performed on a continuous or near-continuous basis if a multi-tasking/multi-threaded architecture is incorporated into the system 100. In such an embodiment, the steps at 160, 162, and 164 can be performed in a simultaneous or substantially simultaneous manner.

At 166, the values in the input matrix 120 are subjected to the operating rules incorporated into the feature matrix 122, resulting in an updated output matrix 124. In a multi-tasking/multi-threaded architecture, the step at 166 is performed on a continuous or substantially continuous basis.

At 168, the output matrix 124 makes itself and the various output values 128 accessible to the various devices 104 and functions 106 within the device group 102.

IV. Architecture-Level Views

A. Hardware-View in a Vehicle Embodiment

Figure 11:
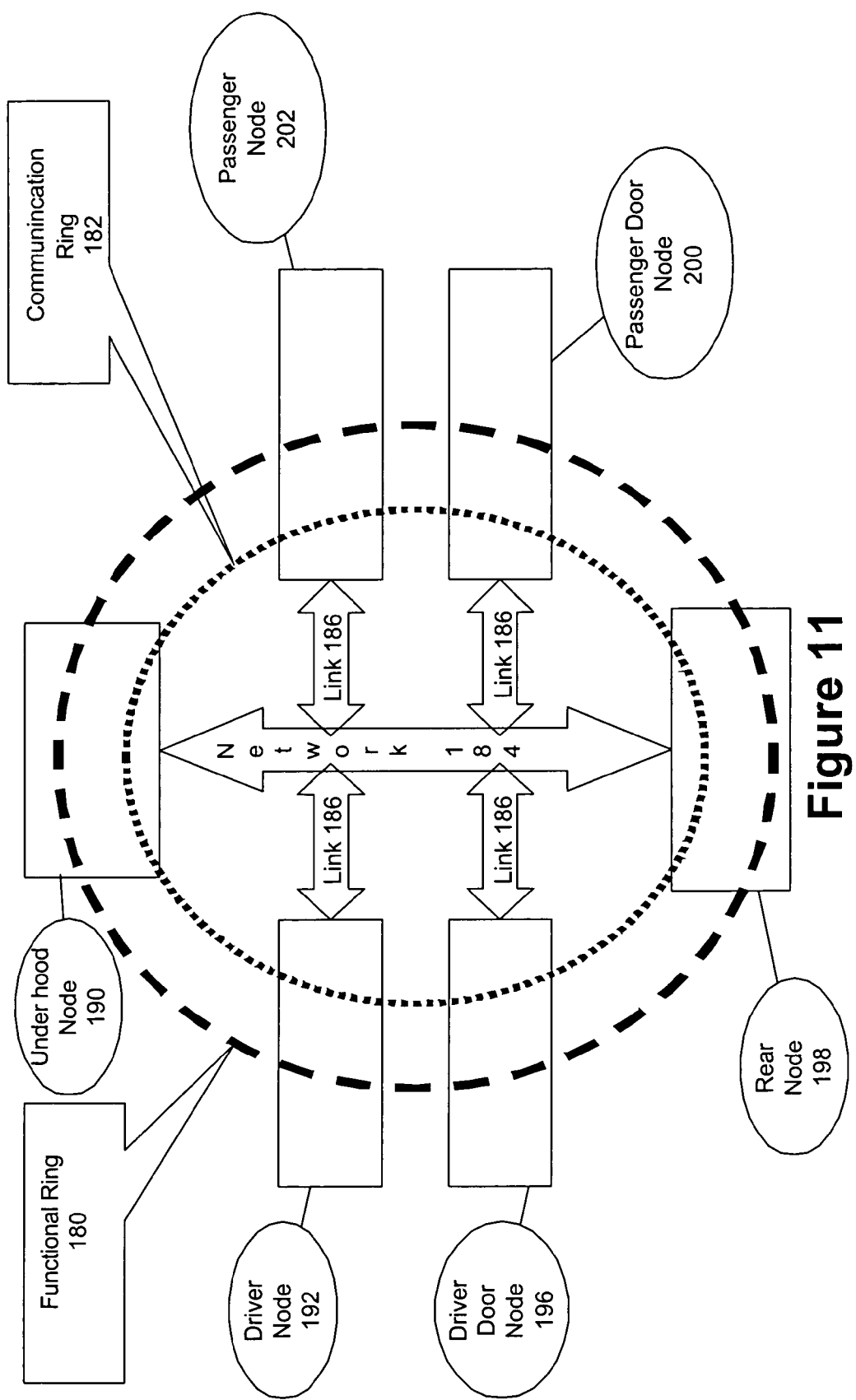
FIG. 11 is a block diagram illustrating an example of a distributed power control architecture that can be incorporated into a vehicle embodiment of a device management system.

FIG. 11 is a block diagram illustrating an example of a distributed power control architecture that can be incorporated into a vehicle embodiment of a device management system 100.

The "backbone" of the system 100 is a computer network 184 with various links 186 of communication to different locations within the vehicle. The network 184 and interconnected links 186 form two rings within the vehicle, a communication ring 182 and a functional ring 180. Both of the rings interconnect with all of the nodes in the vehicle, including but not limited to: an under the hood node 190 for the under the hood functions 106; a driver node 192 for driver-related functions 106; a driver door node 196 for functions 106 relating to the driver's door; a rear node 198 for functions 106 relating to the rear of the vehicle 106; a passenger door node 200 for functions 106 relating to the passenger side door; and a passenger node 202 for functions relating to the area of the passenger.

The particular nodes can vary from embodiment to embodiment. However, as is illustrated, all of the functionality nodes are linked together to the network 184, permitting integration of data for configuration purposes.

In a preferred embodiment, each node includes a ST9 CPU chip with a 20 MHz clock, but only a 2 MHz instruction speed, 128 k of flash memory, 4 k of RAM, 5 timers with a 16 channel 10-bit ADC, and CAN, SPI, and SCI.

B. Processing-Level View

Figure 12:
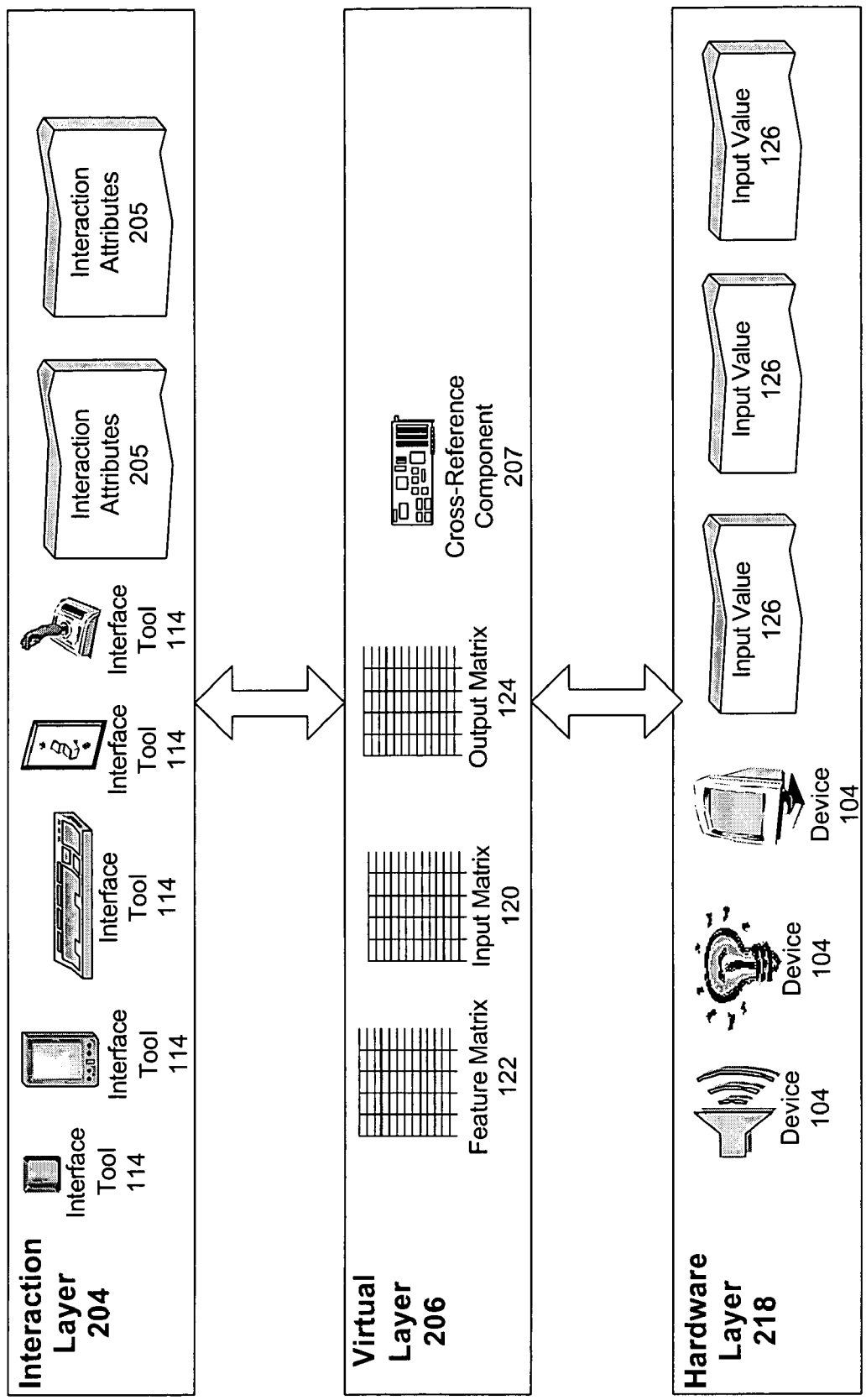
FIG. 12 is a processing-layer architectural diagram that illustrates an example of a device management system.

FIG. 12 is a processing-layer architectural diagram that illustrates an example of a device management system 100.

1. Interaction Layer

An interaction layer 204 is the layer in which a user interacts with the system 100. It can also be the mechanism by which applications not directly integrated with the device group 102, can interact with the device group 102. The interaction layer 204 includes interface tools 114, and interface interactions 116 including the interaction attributes 205 discernible from those interactions 116. The interaction layer 204 operates at a level at which the user of the various devices seeks to invoke certain functionality. Activities at this level of processing do not require knowledge of the underlying hardware configurations. For example, a user does not need to understand the underlying electronics in a DVD player to turn on the DVD player.

2. Virtual Layer

A virtual layer 206 is the interface between the expressed intentions captured in the interaction layer 204, and the hardware-specific requirements of a hardware layer 218. The virtual layer 206 can include the feature matrix 122, the input matrix 120, and the output matrix 124. The virtual layer 206 can also include a cross-reference component 207. In some embodiments, the cross-reference component 207 is the same apparatus as the configuration component 112. In other embodiments, it is a separate component, and in still other embodiments, the functionality is absent. The cross-reference component 207 houses the various mapping heuristics 127 that can be used to bridge any "language differences" between data as understood by the hardware layer 218 and instructions as understood by the interactions layer 204. The cross-reference component 207 can be implemented in such a way as to be modifiable within the host mechanism 118.

3. Hardware Layer

A hardware layer 218 houses the devices 104 that perform the functions 106 desired to be controlled through the interactions layer 204. In many embodiments of the system 100, the virtual layer 206 can be used to translate between conceptual instructions and the potentially hardware-specific input values 126 necessary for the devices 104 and functions 106 to perform as desired.

C. Information Technology Infrastructure View

Figure 13:
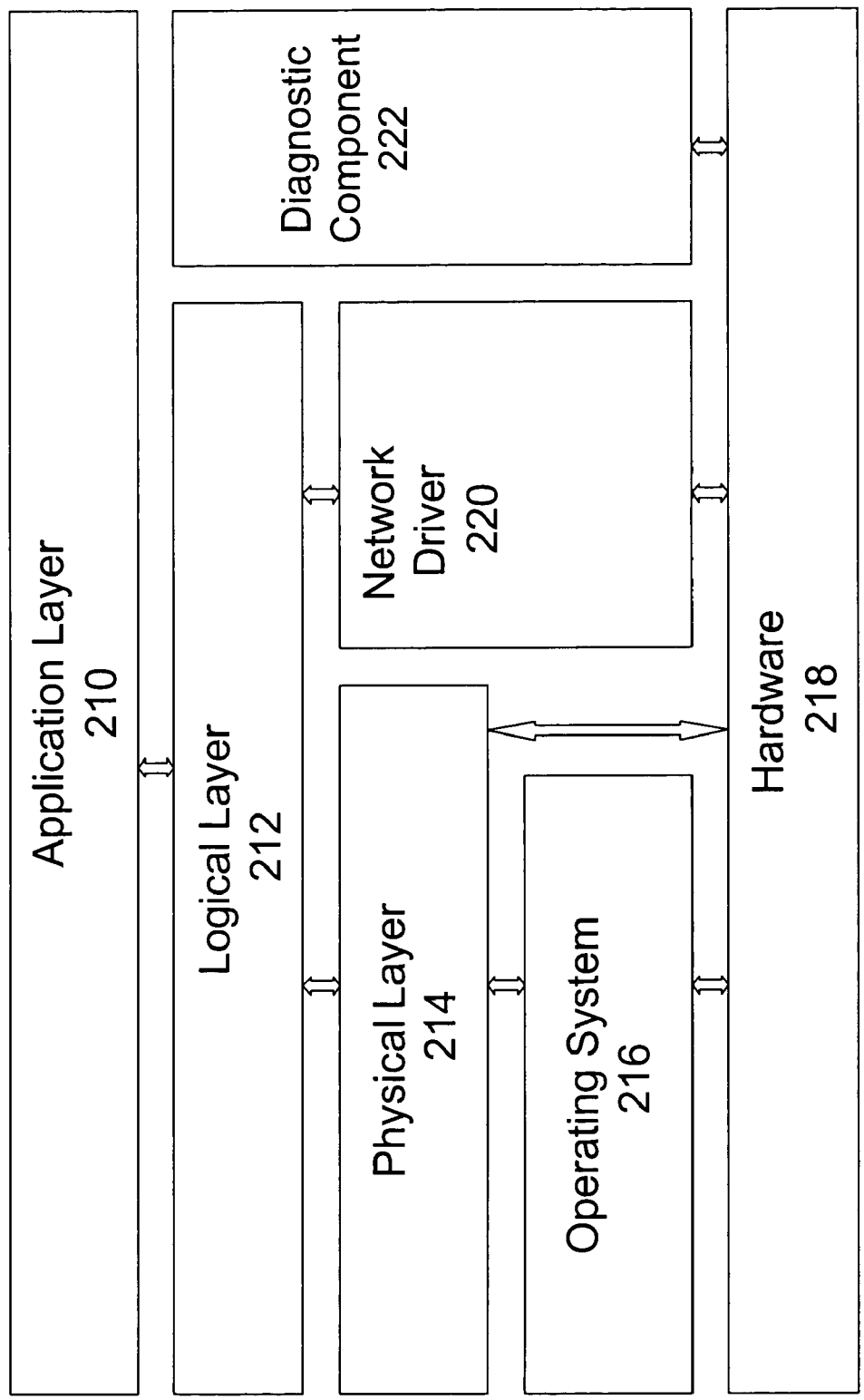
FIG. 13 is an example of an architecture diagram illustrating different processing layers that can be incorporated into an embodiment of a device management system.

FIG. 13 is an example of an architecture diagram illustrating different processing layers that can be incorporated into an embodiment of a device management system 100. FIG. 13 conveys a more information technology-centric view of the architecture that can be used to implement the system 100.

An application layer 210 houses the applications invoked by the system 100. The application layer 210 sits on top of a logical layer 212. The logical layer 212 interacts with the more abstract and conceptual application layer 210, while also interacting directly with a physical layer 214 and a network driver 220. A physical layer 214 resides between the logical layer 212, and the underlying operating system 216 and hardware layer 218. The operating system 216 resides between the physical layer 214 and the information technology and other hardware 218. Similarly, the network driver 220 also serves as an interface between the logical layer 212 and the information technology and other hardware 218.

In a preferred embodiment, a diagnostic component 222 capable of monitoring the hardware 218, does so by directly accessing the hardware 218.

D. Network Communications

Figure 14:
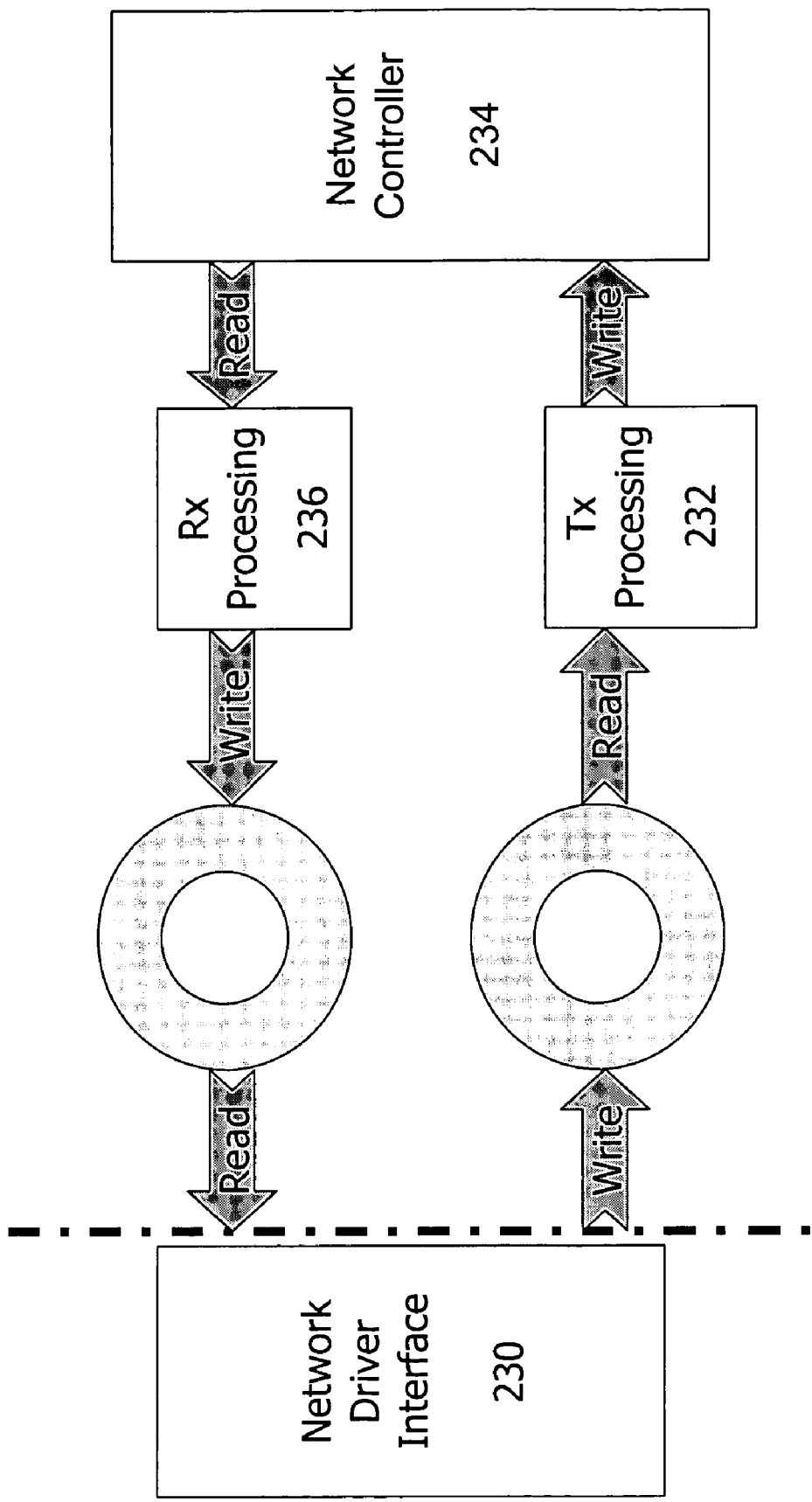
FIG. 14 is a process flow diagram illustrating an example of interactions between a network driver interface and a network controller.

FIG. 14 is a process flow diagram illustrating an example of interactions between a network driver interface 230 and a network controller 234. In a multi-threaded/multi-tasking architecture, there could be numerous such processes acting in a simultaneous or substantially simultaneous manner.

A network driver interface 230 responds to interface interactions 116, output parameters 110 generated by functions 106, and any other demand, request, or constraint placed on the system 100. In a preferred embodiment, all activities requiring the functioning of a network controller 234 are made to go through the network driver interface 230 so that access to functionality can be efficiently prioritized. The network driver interface 230 serves an important gatekeeper function, a role that is particularly important in a multi-tasking environment with device groups 102 that include devices 104 ranging from entertaining "nice-to-have" functions 106 as well as more fundamental and important functions 106. Instructions to write data are conveyed at 232. Conversely, the reading of information is performed at 236.

V. Vehicle Embodiments

The system 100 is not limited to the implementation of automobiles or other types of vehicles. However, vehicle embodiments can provide useful examples of how data integration is both desirable and necessary.

A. An Example of a Populated Feature Matrix

Figure 15:
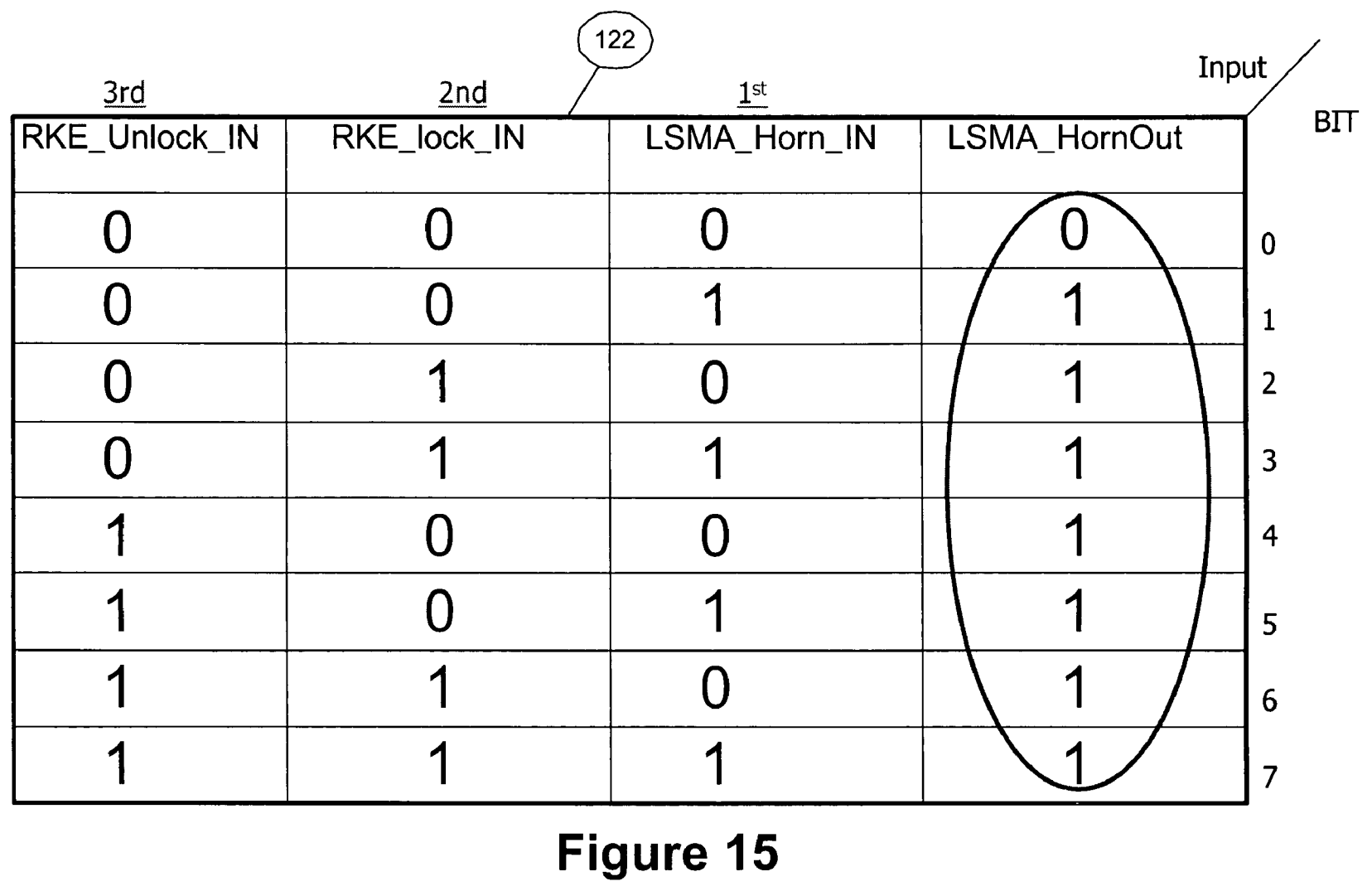

FIG. 15 is an example of a feature matrix 122 that can be included in a configuration component 112 implemented in a vehicle embodiment of a device management system 100

According to the example in FIG. 15, the occurrence of any of the three input parameters 108 with a non-zero input value 126 will result in the honking of the horn. The only row in the feature matrix 122 that does not result in an output value of 1 for the output parameter 110 of LSMA-HornOut is the first row, where all of the input values 126 are 0. Thus, the only sequence of events that will not result in the activation of the horn to generate the appropriate horn sound would be if: (a) nobody is pressing the horn (LSMA_Horn_IN); (b) a remote key is not locking the door (RKE_lock_IN); and (c) a remote key is not unlocking the door (RKE_Unlock_IN). One or more of the three user actions would result in the honking of the horn.

B. Multi-Level Process Flow

Figure 16:
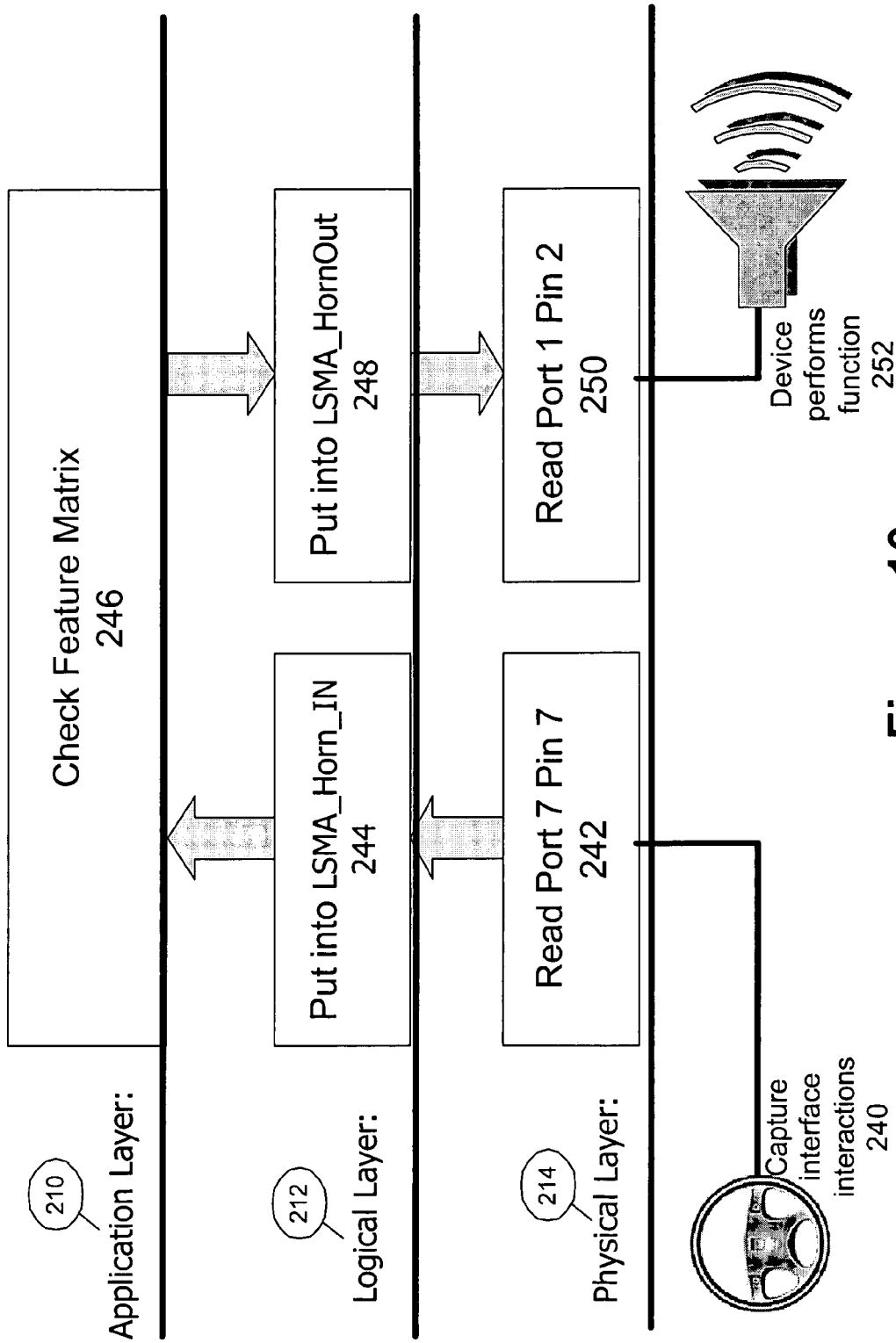
FIG. 16 is an example of a layered-process flow diagram indicating the different processing layers at which particular processing steps can be performed.

FIG. 16 is an example of a layered-process flow diagram indicating the different processing layers at which particular processing steps can be performed in the context of a vehicle host mechanism 118.

Interactions, such as the honking of a horn, are captured at 240. Within the physical layer 214, this results in the reading at 242 or port 7 pin 7. Within the context of the logical layer 212, a value of 1 is put into the appropriate input parameter 108 (LSMA_Horn_In). At the application layer 210, a check feature matrix function is performed at 246. If the feature matrix 122 is the same matrix as disclosed in FIG. 15, the correct output is a value of 1, and thus the feature matrix 122 puts a value of 1 into LSMA_HornOut at 248 within the logical layer 212. This translates to the reading of port 1 pin 2 at 250, which results in the honking of the horn at 252. The example of FIG. 16 can be cross-applied to many different vehicle and non-vehicle embodiments of the system 100.

C. Coding/Programming Considerations

A variety of different programming languages and software design techniques can support the functionality identified both above and below. In a preferred embodiment, the source code is created in such a way as to keep the feature matrix 122 as the focal point for any changes. Because the feature matrix 122 is a data structure, changing the feature matrix 122 does not require the changing of source code (although source code may need to be recompiled), maximizing: adaptability for different hardware configurations; software adaptability; reusability; and efficiency with respect to software maintenance.

FIG. 17 is an example of a source code excerpt 260 for mapping input information 108 from the hardware level 218 to the input matrix 120. FIG. 17 can correspond to step 242 in FIG. 16.

FIG. 18 is an example of a source code excerpt 261 for mapping output information 110 from the output matrix 124 to the hardware level 218. FIG. 18 can correspond to step 250 in FIG. 16.

FIG. 19 is an example of a source code excerpt 262 for mapping input information 108 from the input matrix 120 to the feature matrix 122. FIG. 19 can correspond to step 244 in FIG. 16.

FIG. 20 is an example of a source code excerpt 263 for mapping output information 110 from the feature matrix 122 to the output matrix 124. FIG. 20 can correspond to step 248 in FIG. 16.

FIG. 21 is an example of a source code excerpt 264 that defines the values for a feature matrix 122. FIG. 21 can correspond to step 246 in FIG. 16.

D. Modifications to the Feature Matrix

FIG. 22 is an example of a modification being made to a feature matrix 122. The Figure illustrates a change in operating rules embedded in the feature matrix 122 and the system 100 by simply changing the feature matrix 122. A new updated feature matrix 272 can supercede the old feature matrix 270 without requiring any source code changes because what is the being changed are simply the values in the feature matrix 122.

E. State-Based Processing

One important form of parameter is often the status (which can also be referred to as a state) of another device 102 within the device group 102.

FIG. 23 is an example of a source code excerpt 280 for populating an output matrix 124 with state-related information.

Figure 24:
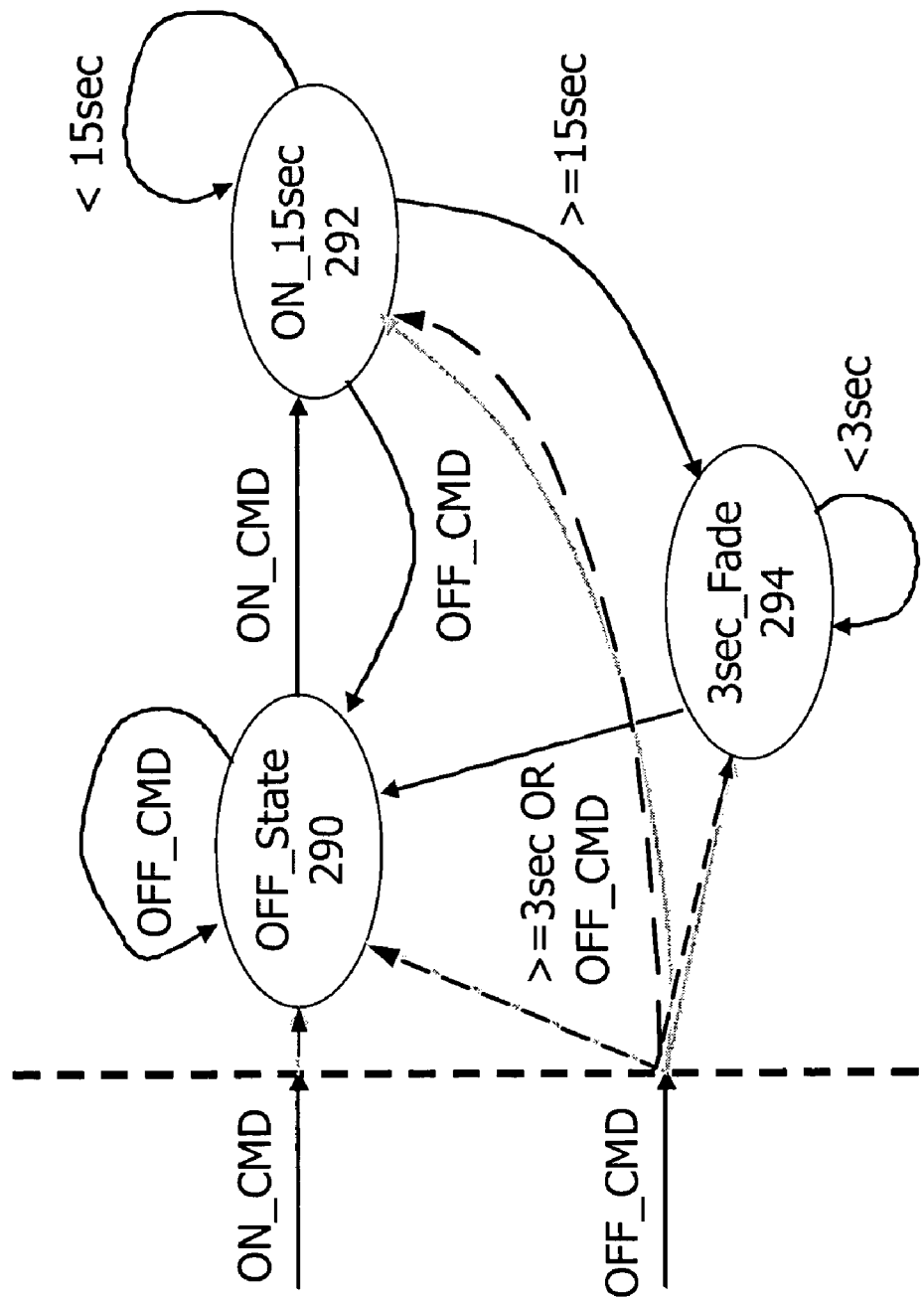
FIG. 24 is an example of a state-transition diagram that can be incorporated into a vehicle embodiment of the system.

FIG. 24 is an example of a state-transition diagram that can be incorporated into a vehicle embodiment of the system 100. The three states illustrated in the diagram include: an off-state 290; an on-state 292; and a 3-second-fade state 294. Different inputs can result in changes between the different states.

VI. Multi-Threaded Process Flow Views

A. Time-Domain Functionality at Different Processing-Levels

Figure 25:
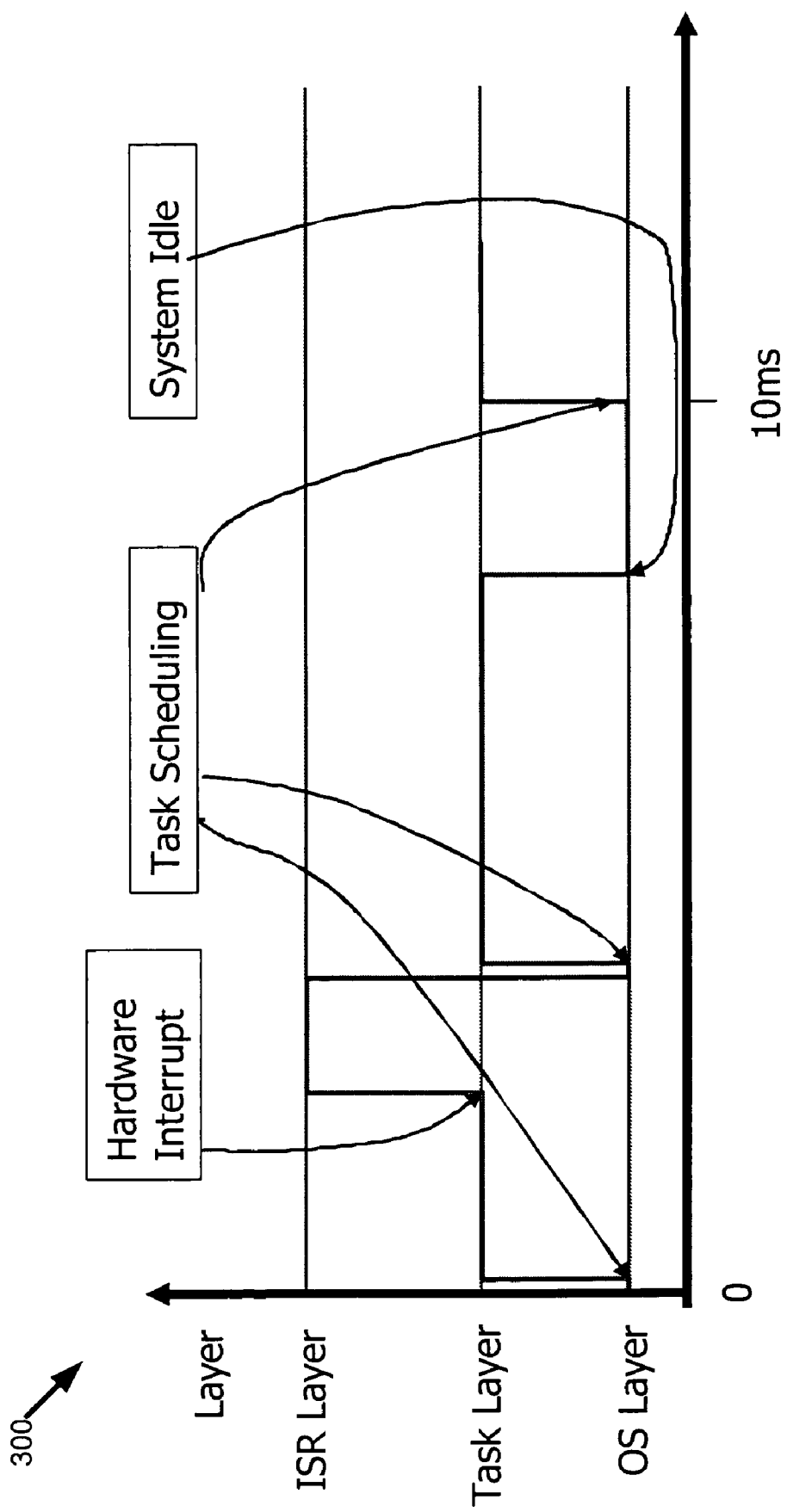
FIG. 25 is an example of a time-domain diagram illustrating different levels of processing that can be performed by the system.

FIG. 25 is an example of a time-domain diagram 300 illustrating different information technology management functions that can be levels of processing that can be performed by the system 100. In a multi-threaded/multi-tasking environment, it can be very important to include the appropriate information technology management processes to coincide with the application-level and function-level goals of the system 100. Processing is performed at many different layers in a very short period of time. Embodiments such as vehicles cannot tolerate the types of delays and performance quality that is widely accepted in general-purpose computing environments.

B. Detailed Overview of Inter-Layer Interactions

Figure 26:
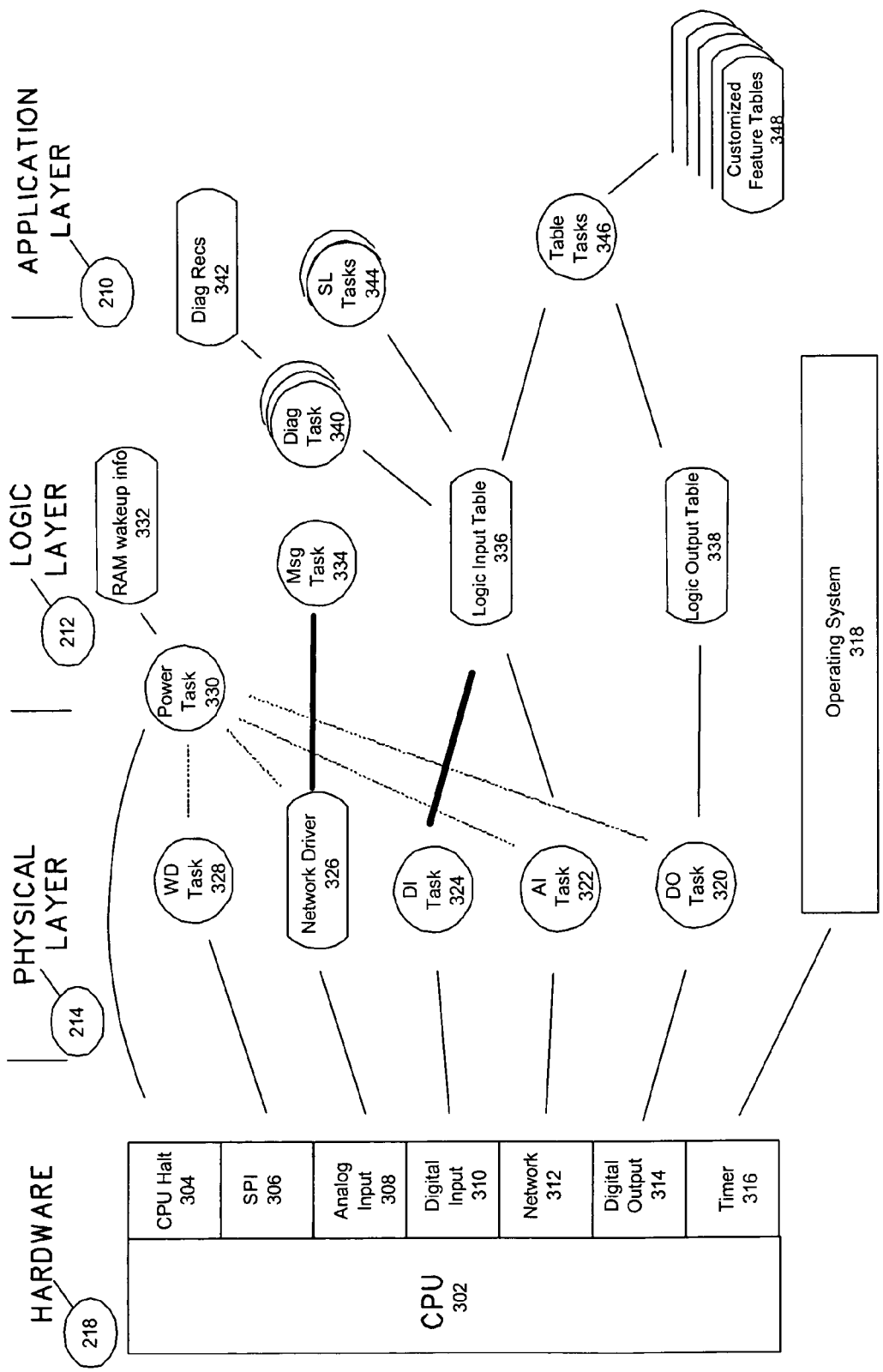
FIG. 26 is an example of a detailed multi-threaded process-flow diagram illustrating examples of different process steps and different processing levels.

FIG. 26 is an example of a detailed multi-threaded process-flow diagram illustrating examples of different process steps and different processing levels.

1. Hardware Layer

The primary component of the hardware level 218 is a central processing unit (CPU) 302. The CPU includes various sub-components, modules, and connections, such as: a CPU halt 304, an SPI (serial peripheral interface) 306, an analog input 308, a digital input 310, a network 312, a digital output 314, and a timer 316.

2. Physical Layer

The physical layer 214 can include: a watchdog task 328 for resetting the CPU if it stops functioning properly; a network driver 326; a DI (digital input) task 324 for populating the input matrix 120; an AI (analog input) task 322 for populating the input matrix 120; a DO (digital output) task 320 for propagating information from the output matrix 124; and an operating system 318 that interacts with the timer 316.

3. Logic Layer

The logic layer 212 can include a variety of functions, including but not limited to: a RAM wakeup information 332; a power task 330 for resetting the CPU; a message task 334 for communicating with the network driver 326; and a variety of diagnostic tasks 340.

4. Application Layer

The application layer 210 can include a variety of diagnostic records 342; SL tasks 344; and table/matrix tasks 346 relating to the interactions of the feature matrix 122 with the input matrix 120 and output matrix 124.

B. Detailed Matrix-Related Process Flows

1. The Loading of the Input Matrix

Figure 27:
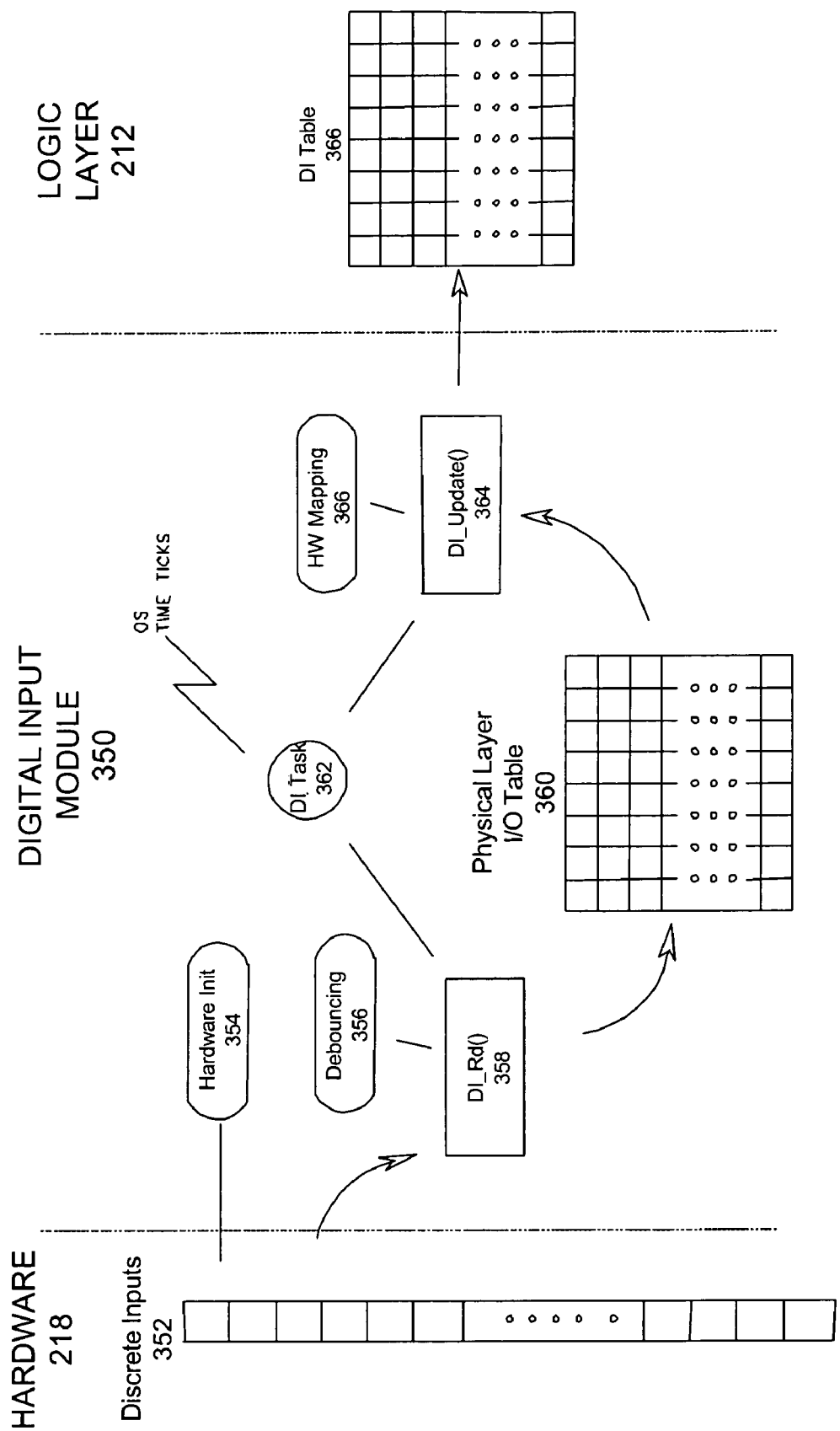
FIG. 27 is a process-flow diagram illustrating an example of the functionality provided by a digital input module in an embodiment of the system.

FIG. 27 is a process-flow diagram illustrating an example of the functionality provided by a digital input module in an embodiment of the system 100. More specifically, FIG. 27 illustrates an example of the loading of the input matrix 120. In the context of FIG. 27, processing relating to the input matrix 120 is performed by a digital input module 350 which loads a digital input table 366 within the logical layer 212.

Discrete inputs 352 originate in the hardware layer 218 through the manipulation or use of interface tools 114. The digital input module 350 can include a hardware initialization process 354 to initiate communications between the hardware 218 and the digital input module 350. A DI (digital input) task 362 initiates and controls the other processes invoked by the digital input module 350. The reading of the discrete inputs is performed by a DI_Rd( ) function 358 which populates a physical layer I/O table 360. When necessary, a debouncing process 356 can also be invoked. A DI_Update( ) function 364 is used to actually populate the DI Table 366 with logical values translated from the physical hardware-based discrete inputs 352. Thus, a hardware mapping 366 process is also part of the digital input module 366. With the populating of the DI table 366, the process continues on FIG. 28.

2. Table Task Processing

Figure 28:
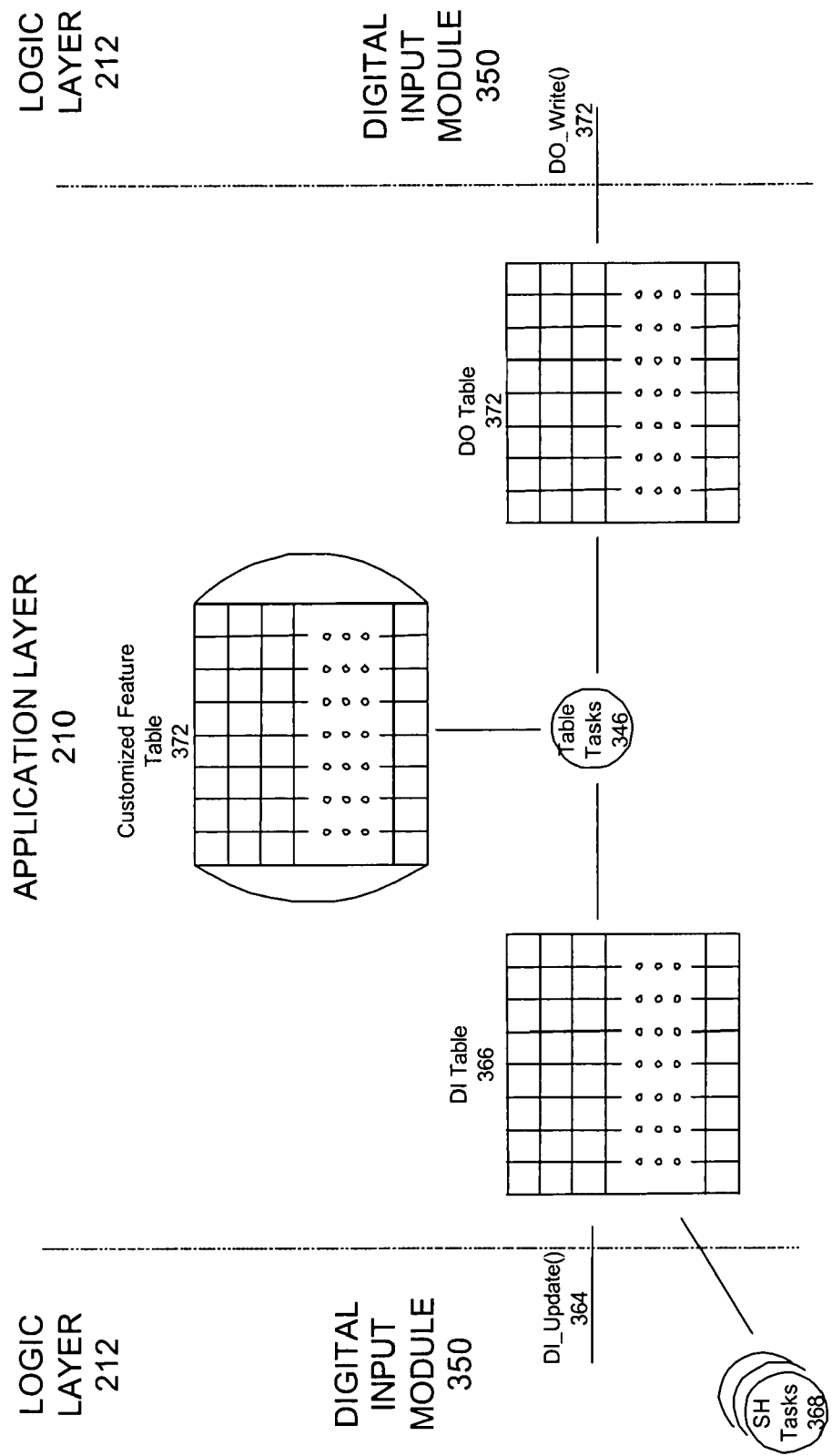
FIG. 28 is a process-flow diagram illustrating an example of application-level processing performed by a digital input module used by the system.

FIG. 28 is a process-flow diagram illustrating an example of application-level processing performed by a digital input module 350 used by the system 100. More specifically, FIG. 28 illustrates the interactions between a feature matrix 122, the input matrix 120, and the output matrix 124.

The population of the DI Table 366 is described above, and illustrated in FIG. 27. Returning to FIG. 28, a table task 346 is used to generate and populate a DO (digital output) table 372 from the DI table 366 and a feature table 372. Upon the population of the DO Table 372, a DO write function 372 is invoked by the digital input module 350, a process that occurs within the logic layer 212. The propagation of the output parameters 110 is disclosed in FIG. 29 and described below.

3. Propagation of Output from the Output Matrix

Figure 29:
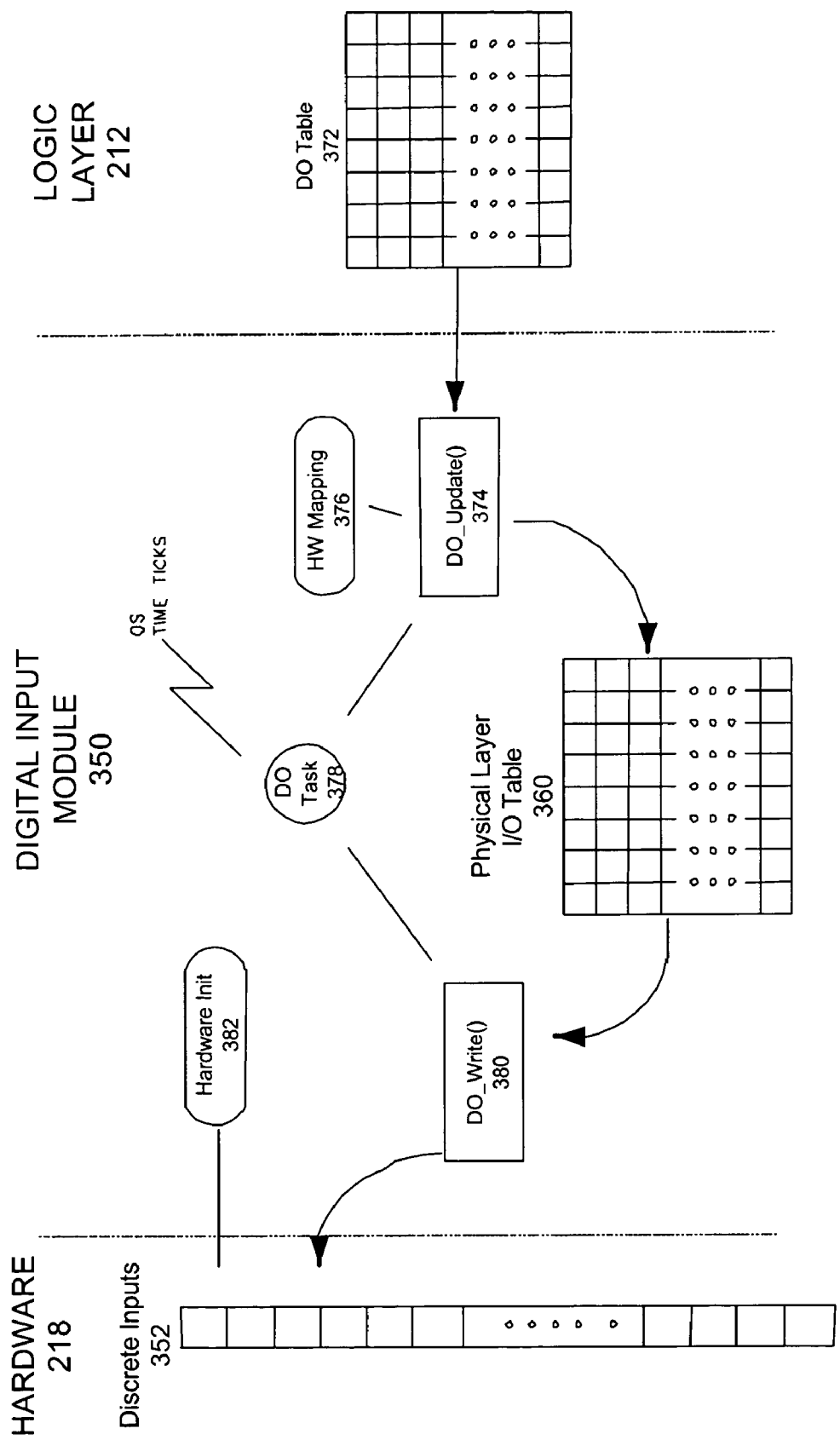
FIG. 29 is an example of a detailed multi-threaded process-flow diagram illustrating examples of different process steps and different processing levels relating to a digital input module.

FIG. 29 is an example of a detailed multi-threaded process-flow diagram illustrating examples of different process steps and different processing levels relating to a digital input module 350. More specifically, FIG. 29 discloses the process of an output matrix 124 propagating the output parameters 110 received as a result of the table task processing 346.

This diagram moves from right to left. A DO (digital out) task 378 uses the DO_Update( ) function 374 to populate the physical layer I/O table 360 with the new values in the DO Table 372. The DO task 378 then invokes the DO Write( ) function 380 to propagate the changes to the discrete inputs 352 in the hardware 218 of the various devices 104.

VII. Alternative Embodiments

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in image alignment systems and methods, and that the invention will be incorporated into such future embodiments.

The invention claimed is:

1. A device management system, comprising:
a plurality of devices, wherein each said device is adapted to perform a device function, wherein each said device function is associated with an input parameter and an output parameter, wherein each said input parameter includes a range of potential input values, wherein each said output parameter includes a range of potential output values, wherein each said output parameter is determined by and associated with at least one said input parameter;
a plurality of configuration components, each said configuration component including an input matrix comprising said input values corresponding to said input parameters and a custom feature matrix comprising operating rules, wherein said input values are selected and set from said range of potential input values to result in a desired said output value within said range of potential output values according to said operating rules, wherein said input matrix is created through a software application; and
a plurality of vehicles, wherein said plurality of vehicles includes a first vehicle type and a second vehicle type, each said vehicle includes a configuration component, and each said custom feature matrix comprises substantially identical operating rules.

2. The system of claim 1, wherein said input matrix is modified through said software application.

3. The system of claim 1, wherein said plurality of devices include a plurality of programmable logic devices, and wherein said plurality of programmable logic devices are located on a vehicle.

4. The system of claim 3, wherein said vehicle includes only one said configuration component.

5. The system of claim 1, wherein said plurality of device functions includes at least two of: a body control function, an engine control function, a transmission control function, a power seat function, a door function, an instrument cluster function, an environmental function, an overhead console function, and a power function.

6. The system of claim 5, wherein said plurality of device functions include a body control function, an engine control function, a transmission control function, a power seat function, a door function, an instrument cluster function, an environmental function, an overhead console function, and a power function.

7. The system of claim 1, wherein said configuration component further includes an output matrix.

8. The system of claim 7, wherein said input matrix, said output matrix, and said custom feature matrix are configured to replace a plurality of nested if statements in a plurality of programming code invoked to perform said device functions.

9. The system of claim 7, said custom feature matrix including a plurality of feature values, wherein said output values are stored in said output matrix, wherein said plurality of feature values are stored in said feature matrix, wherein said output values are generated from said corresponding input values in said input matrix and said corresponding feature values in said feature matrix.

10. The system of claim 7, wherein said input matrix and said output matrix are set dynamically.

11. The system of claim 7, wherein said feature matrix is a static feature table.

12. The system of claim 1, wherein said plurality of device functions includes a first device function and a second device function, wherein said plurality of input parameters includes a first input parameter corresponding to said first device function and a second input parameter corresponding to said second device function, wherein the setting of said first input parameter changes the range of potential input values for said second device function.

13. The system of claim 12, wherein said plurality of devices includes a first device and a second device, wherein said first device function is associated with said first device and wherein said second device function is associated with said second device.

* * * * *